US012704295B2

(12) United States Patent
Kirscht

(10) Patent No.: US 12,704,295 B2
(45) Date of Patent: Aug. 11, 2026

(54) CSP SYSTEM, SENSOR ARRANGEMENT, METHOD AND USE

(71) Applicant: CAMBRAS GMBH, Elmenhorst (DE)

(72) Inventor: Lukas Kirscht, Rees (DE)

(73) Assignee: CAMBRAS GMBH, Elmenhorst (DE)

( * ) Notice: Subject to any disclaimer, the term of this patent is extended or adjusted under 35 U.S.C. 154(b) by 283 days.

(21) Appl. No.: 18/561,378

(22) PCT Filed: May 20, 2022

(86) PCT No.: PCT/EP2022/063710
§ 371 (c)(1),
(2) Date: Nov. 16, 2023

(87) PCT Pub. No.: WO2022/243509
PCT Pub. Date: Nov. 24, 2022

(65) Prior Publication Data

US 2024/0240834 A1 Jul. 18, 2024

(30) Foreign Application Priority Data

May 21, 2021 (EP) .................................... 21175159

(51) Int. Cl.
*G06T 7/70* (2017.01)
*F24S 23/74* (2018.01)
(Continued)

(52) U.S. Cl.
CPC ............... *F24S 23/74* (2018.05); *F24S 40/90* (2018.05); *F24S 50/20* (2018.05); *G06T 7/0002* (2013.01);
(Continued)

(58) Field of Classification Search
CPC .. F24S 23/74; F24S 40/90; F24S 50/20; F24S 30/425; F24S 40/20; G06T 7/0002;
(Continued)

(56) References Cited

U.S. PATENT DOCUMENTS 8,334,972 B2 12/2012 Thien
10,697,669 B2 6/2020 Kirscht
(Continued)

FOREIGN PATENT DOCUMENTS

DE 10 2012 215 153 B3 11/2013
EP 3680575 A1 7/2020
(Continued)

OTHER PUBLICATIONS

Substantive Examination Report Notification, for Saudi Arabia Patent Application No. 523451605, dated Sep. 28, 2024, 15 pages.
(Continued)

*Primary Examiner* — Ali Bayat
(74) *Attorney, Agent, or Firm* — Westman, Champlin & Koehler, P.A.

(57) ABSTRACT

A concentrated solar power (CSP) system includes a reflector, a receiver tube, a shadow receiver arranged and adapted to receive the shadow of the receiver tube; a first digital camera attached to the CSP system to acquire a first image of the reflector and of the shadow receiver, and a controller. The controller identifies a first portion of the first image that comprises the reflector and a second portion of the first image that comprises the shadow receiver, determines a degree of soiling of the reflector based on the first portion of the first image and, ignores all information contained in the second portion of the first image for determining said degree of soiling, and determines an adjustment of the orientation of the reflector based on the second portion of the first image and, ignores all information contained in the first portion of the first image for determining said adjustment.

14 Claims, 21 Drawing Sheets

(51) Int. Cl.

| | |
|---|---|
| ***F24S 40/90*** | (2018.01) |
| ***F24S 50/20*** | (2018.01) |
| ***G06T 7/00*** | (2017.01) |
| ***G06T 7/90*** | (2017.01) |
| ***G06V 20/50*** | (2022.01) |

(52) U.S. Cl.
CPC .................. *G06T 7/70* (2017.01); *G06T 7/90* (2017.01); *G06V 20/50* (2022.01); *G06T 2207/10024* (2013.01); *G06T 2207/10032* (2013.01)

(58) Field of Classification Search
CPC ... G06T 7/70; G06T 7/90; G06T 2207/10024; G06T 2207/10032; G06V 20/50; Y02E 10/47
USPC .......................................................... 382/181
See application file for complete search history.

(56) References Cited

U.S. PATENT DOCUMENTS 11,192,648 B1 * 12/2021 Bayoumi .................. B08B 5/02
2010/0263709 A1 * 10/2010 Norman ................ F24S 30/452 136/246
2011/0265840 A1 * 11/2011 Sela ........................ H02S 50/10 356/218
2013/0133640 A1 * 5/2013 Madore ................. H01L 25/042 126/634
2014/0182578 A1 * 7/2014 Fortin ..................... F24S 10/45 126/600
2017/0363330 A1 12/2017 Kirscht
2020/0107507 A1 * 4/2020 Huang ................. A01G 25/167

FOREIGN PATENT DOCUMENTS

WO 2016107882 A2 7/2016
WO 2019215756 A1 11/2019

OTHER PUBLICATIONS

International Search Report and Written Opinion for International Application No. PCT/EP2022/063710 dated Sep. 1, 2022.
Extended European Search Report dated Oct. 25, 2021, for corresponding European Application No. 21175159.9, 9 pages.
United Arab Emirates Office Action for corresponding UAE Patent Application No. AE P6003011/2023 dated Oct. 7, 2025, 9 pages.

* cited by examiner

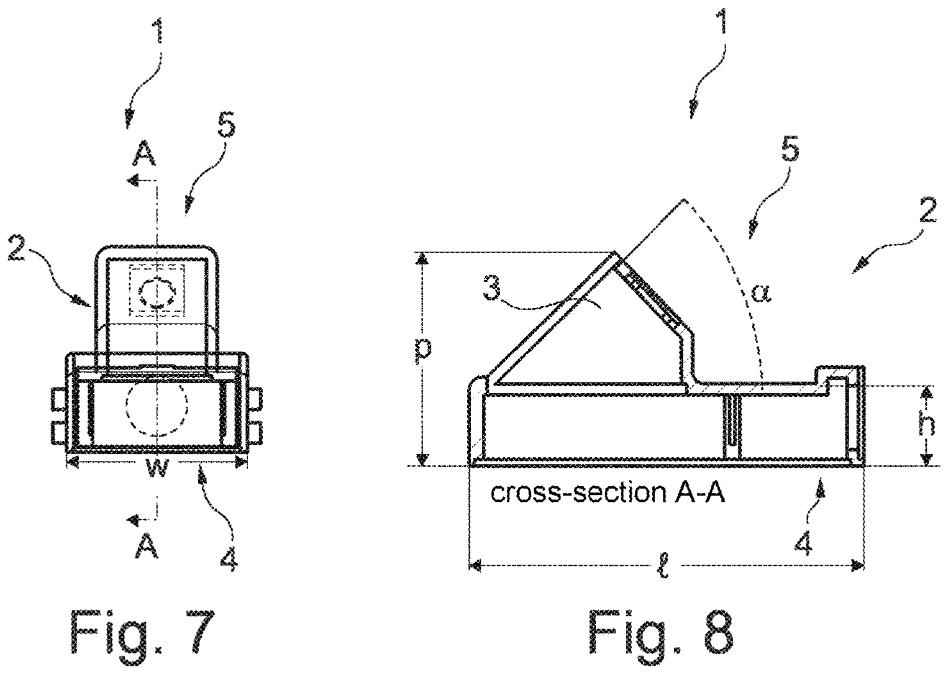
Fig. 7
Fig. 8
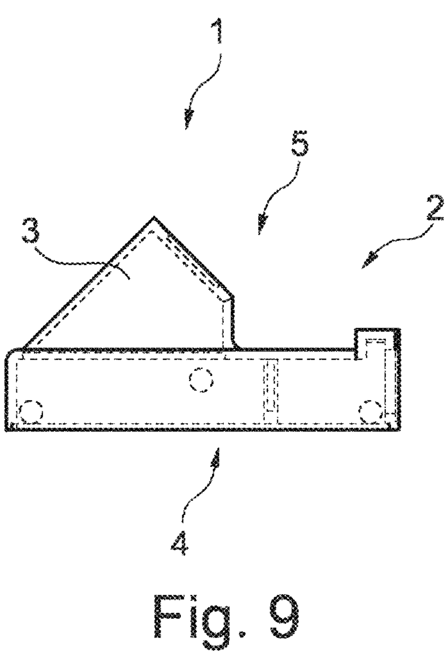
Fig. 9

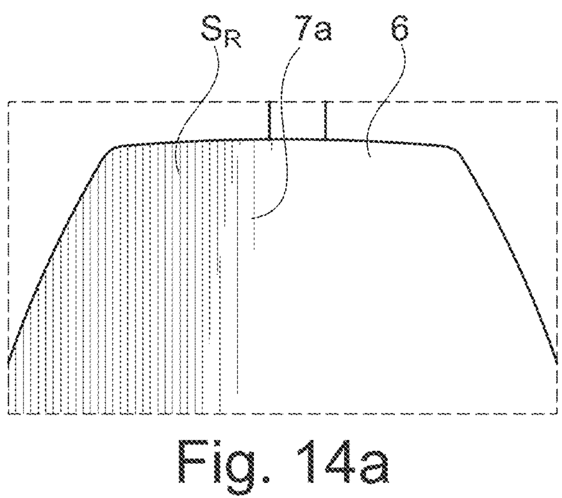
Fig. 14a
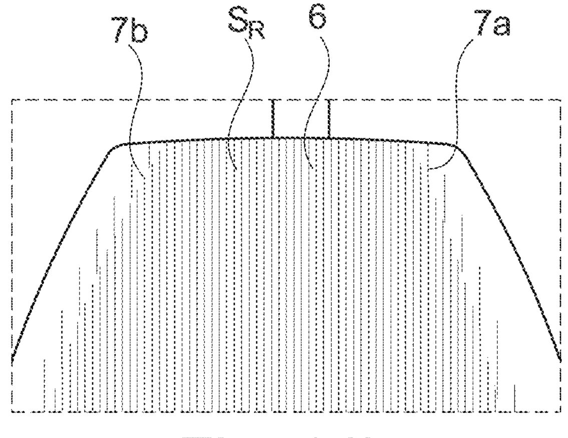
Fig. 14b
6
7b
$S_R$
Fig. 14c cross-section B-B cross-section A-A

CSP SYSTEM, SENSOR ARRANGEMENT, METHOD AND USE

CROSS REFERENCE TO RELATED APPLICATION(S)

This application is a Section 371 National Stage Application of International Application No. PCT/EP2022/063710, filed on May 20, 2022, entitled "CSP System, sensor arrangement, method and use", which published as WIPO Publication No. 2022/243509 A1, on Nov. 24, 2022, in English, which claims priority to European Patent Application No. 21175159.9, filed on May 21, 2021, the contents of which are incorporated herein by reference in their entireties.

BACKGROUND

The present invention relates to a Concentrated Solar Power (CSP) system particularly for determining a degree of soiling of the reflector and determining an adjustment of the orientation of the reflector. Moreover, the invention relates to a sensor arrangement for being mounted to a CSP system for determining a degree of soiling of a reflector of the CSP system. The invention also relates to a method for determining a degree of soiling of a reflector of a CSP system and to the use of a CSP system's tracking arrangement for determining a degree of soiling of a reflector of the CSP system.

The expression Concentrated Solar Power ("CSP") is commonly used as a generic term for this technology. In such systems and methods, usually the direct solar radiation is focused onto a receiver or solar absorber by means of reflectors. Since the position of the sun changes over time, the alignment of components of the system has to be accordingly adapted, i.e. the sun has to be tracked with the system.

CSP systems focus the direct solar radiation by using focusing reflector areas that focus the incident sunlight onto an absorber. The reflector and the absorber are fixed in position to one another and together track the sun. The systems collect solar energy in this way via a large area of the reflector and concentrate it onto a comparably small area of the receiver. The reflector or collector concentrates, for example, radiation incident on an area of 60 $m^2$ onto a receiver area of 1 $m^2$. It is thus possible to achieve low losses and high temperatures by means of the ratio of large collector area to small receiver area.

In so-called solar farm power plants, the heat is collected in many absorbers or receivers distributed over a large area, whereas, for example, in solar tower power plants or parabolic power plants, the solar radiation is focused by means of point concentrators onto a focal spot. All of these systems differ in many features from direct solar systems or solar electricity plants, such as, for example, photovoltaic plants, as well as from solar thermal plants without focusing, such as, for example, thermal power plants.

SUMMARY

The CSP systems within the meaning of the present invention in particular and preferably include systems comprising one or many parabolic trough collectors or Fresnel collectors connected in parallel, so-called linear concentrators. In the collector array, for example, a heat transfer medium is heated, such as, e.g., heat transfer oil or superheated steam. The heated heat transfer medium is subsequently supplied to, for example, a turbine and a generator for the generation of electric energy.

The system of a parabolic trough power plant is exemplarily shown in FIG. 1. A parabolic trough comprises a linear parabolic reflector SP that concentrates light onto a receiver positioned along the reflector's focal line. The receiver usually is a tube positioned directly above the middle of the parabolic mirror and filled with a working fluid. The reflector follows the sun during the daylight hours by tracking along a single axis. A working fluid (e.g. molten salt or oil) is heated to 150-400° C. (oil) or 200-550° C. (molten salt) as it flows through the receiver. The hot fluid can be used for many purposes. Often, it is piped to a heat engine, which uses the heat energy to drive machinery or to generate electricity, or it is piped to a thermal energy storage (TES).

A parabolic trough is a type of solar thermal collector that is straight in one dimension and curved as a parabola in the other two, for example lined with a polished metal mirror. The sunlight which enters the mirror parallel to its plane of symmetry is focused along the focal line and thus concentrated on the receiver tube, which runs along the length of the trough at its focal line and which contains the fluid intended to be heated.

The parabolic trough is usually aligned on a north-south axis, and rotated to track the sun as it moves across the sky each day. Parabolic trough concentrators or reflectors have a simple geometry, but their concentration is about ⅓ of the theoretical maximum for the same acceptance angle, that is, for the same overall tolerances of the system to all kinds of errors. Still, existing systems suffer from suboptimal tracking due to tolerances, e.g., with in the overall construction of the parabolic trough as well as within the power train of the tracking system as well as due to suboptimal tracking algorithms and/or tracking sensor arrangements.

A parabolic trough reflector is made of or comprises a number of solar collector modules (SCM) also referred to as solar collector elements (SCE) fixed together to move as one solar collector assembly (SCA). An SCM could have a length up to 16 meters or more. About a dozen or more of SCM make each SCA up to e.g., 160 or even 200 meters length. Each SCA is an independently-tracking parabolic trough. Within this disclosure, the term "reflector" may either refer to an entire SCA or to portions thereof, e.g., the SCM and/or SCE.

An SCM may be made as a single-piece parabolic mirror or assembled with a number of smaller mirrors in parallel rows. In addition, V-type parabolic troughs exist which are made from 2 mirrors and placed at an angle towards each other.

As shown, the reflector, preferably the parabolic trough collectors SP focus the sunlight So onto an absorber tube or a so-called receiver R extending in the focal line (cf. right illustration). In the absorber tubes, the concentrated solar radiation is converted into heat and dissipated to a circulating heat transfer medium. The heat medium is than passed through pipes (solar field piping) for further use or energy generation (conversion), as referred to above. For reasons of cost, the parabolic troughs usually track the sun only uniaxially. Therefore, they are arranged in the north-south direction and track the sun or are tilted only according to the solar altitude during the course of a day. This is schematically illustrated in FIG. 2. This system, as well as the other reflectors, SCAs, SCMs and SCEs etc., respectively, further described herein, may advantageously be used together with or as part of the present invention.

Parabolic troughs or parabolic trough mirrors have a cross-section that is essentially parabolically configured, preferably in the cross-section perpendicular to the trough axis. The parabolical trough axis may also be referred to as vertex of the respective parabola. Such a shape of the mirror has the property that all rays incident parallel to its axis of symmetry are reflected through the focal spot of the parabola (cf. right illustration in FIG. 1). This geometric principle is applied, i.a., for parabolic (trough) mirrors using a parabolic area comprising reflecting surfaces (mirrors) in order to concentrate incident sunlight in a focal spot or in the case of a parabolic trough mirror on a focal line. The energy of the focused sunlight is absorbed by so-called receivers mounted along the focal spot or the focal line and, converted for example into heat, used for further energy conversion. Known parabolic trough mirrors essentially comprise a trough-like or curved mirror (or a plurality of mirrors forming together a trough) also referred to as reflector, an absorber tube also referred to as receiver and a supporting structure or base.

The solar collector modules (SCM) of a solar collector assembly (SCA), also referred to as a parabolic trough SP often only form half of the parabolic trough when seen in cross section of the longitudinal axis of the parabolic trough and may leave a gap at the deepest point of the trough. In this case, preferably a beam, for example a so-called torsion tube, may extend along the longitudinal axis of the trough at this point (of the cross-section). This can be deduced, for example, from the illustrations according to FIGS. 3*a*, 3*b*, 3*c*, 3*d*, and 3*e*. This beam is tightly connected with and may form part of the supporting structure or guide matrix of the SCA. Preferably, it extends parallel to a pivot axis, which in turn preferably extends along the deepest point of the trough and along which the trough can be pivoted in order to achieve an optimum orientation towards the sun. Alternative embodiments of the general design are known. For example, there may not be a beam or torsion tube as referred to above but merely a gap at the deepest point of the trough between the SCM's forming an SCA. Also, there may not even be a gap but the parabolic trough may be closed at its deepest point. The discussion of the present invention herein includes the previously described designs but is not limited thereto.

Precise alignment and focusing of the solar radiation are necessary due to the concentration of the solar radiation onto a comparatively small receiver area. A further criterion is the alteration in the position of the sun and thus in the angle of incidence of the solar radiation as a function of time and solar altitude. Therefore, a tracking arrangement is required for following the sun with systems concentrating solar power. In this connection, the calculated position of the sun is usually used as actual value. However, this entails problems in practice.

In particular, the actual solar radiation can deviate from the solar radiation expected as a result of the calculated position of the sun. This deviation is not astronomically caused but, for example, is due to light refractions of the solar radiation at air layers having considerably differing temperatures. Furthermore, deviations from the pre-calculated or calculable radiation paths occur due to constructional inaccuracy during building the system, constructional inaccuracy developing in the course of operation, e.g., base movements, as well as constructional inaccuracy caused by the wear of drives, as well as inaccuracy resulting from sensory difficulties when recording the actual position.

Consequently, the components of the system have to fulfill a number of requirements. For example, the substructure holding the reflector and/or receiver is of importance as regards the exact positioning of reflector and/or receiver. Therefore, high demands on dimensional accuracy, weather resistance, wind load, grounding, and weight have to be met. The tracking system or tracking, whether discontinuous or continuous, must also fulfill requirements with respect to starting accuracy, holding accuracy, energy consumption, safeguarding against failure and policy compliance. The system components, in particular of the substructure and tracking arrangement, are of particular importance as regards the aforementioned constructional inaccuracies in tracking.

In order to attenuate or eliminate the aforementioned and further problems with tracking, systems are used that determine the actual position of the sun and the actual solar radiation deviating from the expected solar radiation. In this connection, the angle of incidence of the solar radiation onto the reflector is of particular importance.

To this end, it is known, on the one hand, to use systems which are completely independent and not connected to the structure to be respectively aligned and which determine the actual position of the sun. These systems include, for example, a sundial. However, this usually does not overcome at least the aforementioned problems resulting from constructional inaccuracy, from wear or ageing.

Alternatively, it is known to combine the position measurement with the system design and to perform a relative position measurement of the sun with respect to the concentrating system. As regards this measurement, ways are known to measure the radiation directly at the receiver. However, this turned out to be a non-viable option as well. In particular, the radiation intensity/density at the receiver is very high so that the requirements which the sensors as well as the components have to fulfill are beyond the available scope—as regards both economic criteria and the general fulfillment of the technical requirements. As far as available, the lifetime of the components is extremely short.

It is also known to resort to the observation of a shadow by means of specific sensors which analyze the cast shadow. In this connection, the shadow cast by a blind is analyzed by means of a sensor comprising two photovoltaic (PV) cells. When the shadow extends symmetrically on the centre line of the PV cell array, the tensions of the two cells have the same value. When the shadow migrates out of the centre due to movement of the collector or the sun, the tension of the cell that is shaded more than the other reduces.

Such a system usually consists of a PV cell sensor connected via wiring to a signal amplifier which in turn is connected to a separate control unit in the solar field for signal processing, said control unit being accommodated in a separate housing. The control runs a program for analyzing the signal values and transmits the results via wiring via an interface to the control room. Control signals are then sent to the plant for accordingly adapting the alignment of the system.

However, such systems have proven to be disadvantageous in several respects. On the one hand, they are complex and their installation and maintenance is cost-intensive and service-intensive. For example, they have to be cleaned about twice a day or more often. On the other hand, the resolution and accuracy of the systems is not sufficient. Furthermore, the lifetime of the system is limited and high costs arise due to construction-related maintenance work and repairs as well as due to software-related maintenance. Finally, the installation of the entire system is intricate and involves comprehensive interference with the existing system architecture.

WO 2016/107882 discloses a CSP system comprising a reflector, i.e. a parabolic trough mirror, with a receiver tube for concentrating the solar radiation incident on the reflector onto the receiver, comprising a shadow blind and a shadow receiver as well as a camera arranged to detect the shadow of the shadow blind on the shadow receiver in order to determine a deviation of the actual shadow position from a target shadow position, a tracking means configured to adapt the position of the reflector and the receiver according to the deviation. The reflector and the receiver are connected to and held by a supporting substructure. The shadow blind is the receiver itself and the reflector is the shadow receiver. Moreover, a T-beam and preferably the torsion tube of the substructure functions as the shadow receiver. The CSP system, the sensor arrangement and the corresponding tracking method of WO 2016/107882 are incorporated herein in its entirety.

While this system is improved over other technologies known from the prior art it still suffers from some disadvantages. For example, accuracy of the tracking can only be as good as the accuracy of the sensor's mounting position. This put a high demand on mounting accuracy as well as bears the risk of deterioration over time, e.g. due to drift, e.g. based on temperature or age, of the construction and/or the sensor.

A further issue that may arise with CSP systems is that the reflector may become soiled, e.g., by deposition of sand, pollen or the like. Furthermore, air humidity may condense on the reflector overnight and evaporate on the next day, which may result in flow lines of the condensed liquid on the reflector.

U.S. Pat. No. 8,334,972 B2 describes a device for detecting soiling, e.g., on surfaces of solar collectors having a light source, which emits a light beam, and a layer having a first boundary surface and a second boundary surface, whereby the light beam emitted by the light source first impinges on the first boundary surface, and part of a light beam fraction, which is scattered at the second boundary surface, impinges on a receiver and forms a measuring signal, and hereby the first boundary surface is set up to scatter part of the incident light beam, and the part impinging on the receiver of the light beam, scattered at the first boundary surface, forms a reference signal, and the device is set up further to determine a measure for the soiling of the second boundary surface from the comparison of the reference signal and measuring signal.

DE 10 2012 215 153 B3 describes a measuring system for pollution measurement on a solar mirror, which comprises a first measuring device for determining the direct radiation from the sun and a second measuring device for determining the direct radiation from the sun reflected by the solar mirror or direct radiation scattered by dirt particles on the solar mirror, the first measuring device being directed towards the sun and the second measuring device being directed at least partially, i.e. with at least one sensor, towards the solar mirror. Typically, the measuring devices are pyrheliometers. These devices, however, have a complex structure that has to be added to the CSP system and are rather expensive. Moreover, they have also a very limited capability of identifying the nature and the degree of the soiling more precisely.

The inventors of the present invention have recognized that, by identifying the nature and/or the degree of the soiling of the reflector more precisely, the cleaning routine of the reflector may be optimized. For example, information on the nature and the degree of the soiling could be used for choosing the optimal cleaning additives and/or to optimize the cleaning intervals. By optimizing the cleaning routine of the reflector, the efficiency of the CSP system may be increased.

In view of the above, the present invention is based on the problem of providing an improved CSP system. The system should preferably overcome the disadvantages of the prior art. In particular, it is intended to be simple to build and handle, economical, long-lasting and accurate. Moreover or alternatively, it is intended to allow improved accuracy in tracking and to allow improved operation of a solar field comprising two or more CSP systems. Furthermore, the present invention may also be based on the problem of improving the efficiency of the CSP system. In particular, an object of the invention may be seen in improving the cleaning routine of the reflector, more particularly in improving the identification of the nature and/or degree of soiling on the reflector.

These problems are solved in particular by an improved CSP system, sensor arrangement, and method as disclosed herein. Preferably, the problem is solved by the subject-matter of the independent claims and aspects. The dependent claims and aspects as well as the features described in the following are preferred additional or alterative embodiments.

Preferably, a CSP system within the meaning of the invention comprises one or more reflectors formed as parabolic trough collectors. Such a reflector or parabolic trough collector may be made of a number of solar collector modules (SCM) also referred to as solar collector elements (SCE) fixed together to move as one solar collector assembly (SCA). Each SCA is an independently-tracking parabolic trough. Many SCA's may make up a solar plant or solar field. Within this disclosure, the term "reflector" may refer to each one of these entities.

As shown, the reflector, preferably the parabolic trough collectors SP focus the sunlight So onto a receiver, preferably an absorber tube or a so-called receiver tube R extending in the focal line of the parabolic trough. In the receiver, the concentrated solar radiation may be converted into heat and dissipated to a circulating heat transfer medium.

The parabolic troughs usually track the sun only uniaxially. Therefore, they are preferably arranged in north-south direction and track the sun or are tilted only according to the solar altitude during the course of a day. This tracking or tilting is achieved by a tilting/pivoting the parabolic trough/SCA about a tracking or tilting axis (as schematically illustrated in FIG. 2).

The solar collector elements (SCE) of a solar collector assembly (SCA), also referred to as reflector or parabolic trough collector often only form half of the parabolic trough when seen in cross section through the longitudinal axis of the parabolic trough and may leave a gap at the deepest point of the trough. The SCA is positioned, supported and guided by a supporting structure or guide matrix which holds the solar collector elements (SCE). Also, there may not even be a gap but the parabolic trough may be closed at its deepest point. The discussion of the present invention herein includes the previously described designs but is not limited thereto.

The present invention particularly relates to a CSP system comprising a reflector, a receiver tube, a shadow receiver arranged and adapted to receive the, preferably full, shadow of the receiver tube, a first digital camera fixedly attached to the CSP system and arranged and configured to acquire a first image of the reflector and of the shadow receiver, and a controller. The controller is configured to identify a first portion of the first image that comprises the reflector and a second portion of the first image that comprises the shadow receiver; determine a degree of soiling of the reflector based on the first portion of the first image and, preferably, ignore all information contained in the second portion of the first image for determining said degree of soiling; and determine an adjustment of the orientation of the reflector based on the second portion of the first image and, preferably, ignore all information contained in the first portion of the first image for determining said adjustment.

In the context of the present invention, the "degree of soiling of the reflector" preferably includes the amount or thickness of soiling and soiling layer, respectively, on the reflector and/or the nature or kind of the soiling. The nature of the soiling may, e.g., include flow trails of condensed humidity, sand, pollen and other organic soiling.

In other words, the CSP system comprises an arrangement for determining a degree of soiling of the reflector and determine an adjustment of the orientation of the reflector. For this purpose, the CSP system comprises the first digital camera configured to acquire a first image of the reflector and of a shadow receiver of the CSP system. Said first image is used for both, the determination of the degree of soiling of the reflector and the determination of the adjustment of the orientation of the reflector. Thus, the same camera is used for acquiring image information for determining the degree of soiling of the reflector and for determining the adjustment of the orientation of the reflector.

Preferably, the controller may further be configured to identify the nature of the soiling.

The first image preferably comprises only one image. However, it may also comprise more than one images also referred to as "sub-images". For example, the first portion may be identified from a first sub-image of the first image and the second portion may be identified from a second sub-image of the first image. Nevertheless, the first portion and the second portion may be identified from image data stemming from the same first camera.

By using the same camera for acquiring the first image that is used for determining the degree of soiling of the reflector and for determining the adjustment of the orientation of the reflector, no additional technical component has to be provided to the CSP system for determining the degree of soiling of the reflector. Rather, the CSP system can use the same technical components for determining the adjustment of the orientation of the reflector and for determining the degree of soiling of the reflector. In this way, a simple and cost-efficient solution for determining the degree of soiling of the reflector is provided.

The shadow receiver may be an existing structure of the CSP system. For example, the reflector and/or a T-beam, preferably the torsion tube of the substructure, of the CSP system may function as the shadow receiver, as disclosed in WO 2016/107882, which is incorporated herein in its entirety.

Alternatively, the shadow receiver may be an additional structure, which, e.g., forms part of a sensor arrangement including the above-mentioned camera as disclosed further below.

The type of digital camera may multi-line camera, preferably a CCD or CMOS camera. Multi line cameras are particularly advantageous for the present application, since they allow acquiring a two-dimensional image having a first portion comprising the reflector and a second portion having the shadow receiver. Moreover, such a camera may enable recognizing of patterns in the second portion of the first image, which improves the identification of the soiling of the reflector. Moreover, the analysis of multiple lines, may also be beneficial to recognize and ignore artifacts and/or pollution in the first portion of the first image. As a camera sensor, for example, SONY Exmor IMX323 sensor, resolution 1920×1080 Pixel, lense:3.6 mm (F:1,4) has proven suitable.

The first portion or image area comprises the reflector and the second portion or image area comprises the shadow receiver. It is to be understood that the first and second portion of the first image comprise an image or a representation of the reflector and an image or a representation of the shadow receiver, respectively. Moreover, the first portion or image area may comprise only a part of the reflector and the second portion or image area may comprise only a part of the shadow receiver. Preferably, the first portion or image area does not comprise any portion of the shadow receiver and the second portion or image area does not comprise any portion of the reflector. The first portion and/or the second portion may each comprise one or more separate portions or image areas.

Preferably, the first portion of the first image comprises a reflecting surface, mirror or collector of the reflector.

The controller may be a processing unit that is configured to determine the degree of soiling and determine the adjustment of the orientation of the reflector as disclosed herein. The controller may comprise program code or software that implements the method steps or configurations of the controller. The program code or software may comprise different services, for example, a service for determining the degree of soiling, a service for determining the adjustment of the orientation of the reflector or optical tracking, a service for acquiring the first and the second image.

The service for acquiring the first and the second image may acquire the first and second images and send these images to the services for determining a degree of soiling and for determining the adjustment of the orientation of the reflector or optical tracking. Additionally or alternatively, the services for determining a degree of soiling and for determining the adjustment of the orientation of the reflector or optical tracking may request the first and second image from the first and second camera, respectively. Each of the services for determining a degree of soiling and for determining the adjustment of the orientation of the reflector or optical tracking may determine the first and second portion of the first image, respectively.

The controller may, e.g., be a server that is connected to the CSP system via the internet. Alternatively, the controller may be a server located within a network of the CSP system. In both cases, the controller may be provided in the form of a distributed computing system.

Preferably, the CSP system may include means for setting or adjusting a cleaning routine of the reflector based on the determined degree of soiling.

For example, setting or adjusting the cleaning routine may include setting or adjusting a type and/or a dosage of a cleaning agent and/or a type of a cleaning device and/or a setting of a cleaning device. The type of the cleaning device may, for example, include a cleaning brush, a high-pressure cleaner, a sponge, and/or a cloth. The setting of the cleaning device may, e.g., include a pressure of the high-pressure cleaner. Furthermore, setting or adjusting the cleaning routine may include setting or adjusting an intensity of the cleaning routine.

For example, the means for setting or adjusting a cleaning routine may comprise a communication means, e.g., a transceiver and/or a display, for communicating the setting and/or adjusting of the cleaning routine to the cleaning staff.

Preferably, the controller is configured to identify dirt patterns in the first image, more preferably in the first portion of the first image.

Preferably, the controller is configured to perform pattern recognition to identify the dirt patterns.

By identifying dirt patterns in the first image, a more precise identification of the nature of the soiling may be provided. Such dirt patterns may, e.g., occur on the reflector when humidity in the air condenses on the reflector overnight and subsequently evaporates the next day, which results in flow trails on the reflector.

For example, the controller may be configured to identify dust by determining that the first portion of the first image comprises an even halo or the like. The controller may be configured to identify condensation by determining that the first portion of the first image comprises circular and/or honeycombed structures. The controller may be configured to identify condensation by determining that the first portion of the first image comprises strip-like structures that are perpendicular to the rotation axis of the reflector. The controller may be configured to identify residues from cleaning the mirror by determining that the first portion of the first image comprises strip-like structures that are not perpendicular to the rotation axis of the reflector.

Preferably, the controller is configured to conduct or perform a spectral analysis on the basis of the first image, preferably the first portion of the first image.

By conducting a spectral analysis, the nature of the soiling may be identified more precisely.

Preferably, the controller is configured to perform pattern recognition to identify dirt patterns and a spectral analysis.

Preferably, controller is configured to perform the spectral over a spectral range of the first and/or second camera, in particular of a sensor (e.g., CCD sensor) of the first and/or second camera, respectively.

Preferably, the spectral analysis may comprise determining a numerical representation of the different colour components of the first portion of the first image. For example, the numerical representation may be a RGB triplet.

Preferably, the second camera, in particular the optics of the second camera, may be configured to take a hemispherical image of the sky. Preferably, the second camera may have a viewing angle between 90 degrees and 180 degrees, preferably between 120 degrees and 160 degrees, more preferably between 130 degrees and 150 degrees, more preferably of approximately 140 degrees.

Preferably, the CSP system further comprises a second digital camera, preferably fixedly attached to the CSP system, configured to acquire a second image of the sky, wherein the controller is configured to determine the degree of soiling also on the basis of the second image.

Preferably, the controller is configured to perform the spectral analysis on the basis of the first portion of the first image and the second image.

Preferably, the second image may be a reference image. By combining the first image and the second (reference) image, the spectral analysis may be improved. Furthermore, the controller may also be enabled to remove artifacts that are due to, e.g., clouds that are reflected by the reflector. In this way, the quality of the determination of the degree of soiling may be improved.

The second image may comprise a segment of the sky. Preferably, the second image may comprise a segment of the sky that is reflected in a section of the reflector that is depicted in the first portion of the first image. For example, the controller may be configured to extract a portion of the second image that corresponds to the segment of the sky that is reflected in a section of the reflector that is depicted in the first portion of the first image. For example, the camera may be attached to the CSP system such that its alignment is adjusted together with the reflector and the second camera is directed towards the segment of the sky that is reflected in a section of the reflector that is depicted in the first portion of the first image.

The controller may be configured to determine a numerical representation of the different colour components, e.g., a RGB triplet, from the second image. For example, the controller may be configured to determine a numerical representation of the different colour components, e.g., a RGB triplet, of the segment of the sky that is reflected in a section of the reflector that is depicted in the first portion of the first image. Furthermore, the controller may be configured to take other segments of the sky into account for determining the numerical representation, e.g., RGB triplet.

Preferably, the controller is configured to determine an average numerical representation of the different colour components, e.g., RGB triplet, of the first portion of the first image and/or of a portion of the second image, respectively.

Preferably, the controller is configured to determine the degree of soiling by determining a difference between a numerical representation of the different colour components, e.g., RGB triplet, of the first portion of the first image and a numerical representation of the different colour components, e.g., of the second image.

Preferably, the controller is configured to determine a nature of the soiling by solving a set of equations, preferably a set of linear equations, the set of equations being based on at least a numerical representation of the different colour components, e.g., RGB triplet, of the first portion of the first image and a numerical representation of the different colour components, e.g., RGB triplet, of the second image. For example, the set of equations may be solved by means of Gaussian elimination.

One or more of the unknows, which are determined by solving the set of equations, provides/provide information on the nature of the soiling.

Preferably, the first digital camera and the second digital camera have the same type of imaging sensor.

By ensuring that the first digital camera and the second digital camera have the same imaging sensor, the quality and/or significance of the reference image (second image) may be improved. For example, the sensors of the first camera and the second camera may have the same RGB proportions.

Preferably, the controller is configured to identify a spectral range or spectral ranges that is/are reduced and/or enhanced in the first image, preferably vis-à-vis the second image.

Preferably, the controller is configured to determine that the soiling comprises organic soiling by determining that the red-component and/or green-component are/is enhanced in the first image and/or the green component and/or blue component are/is reduced.

Preferably, the controller is configured to determine that the soiling comprises mineralic soiling by determining that no spectral range or component is substantially reduced or enhanced.

Preferably, the reflector is a parabolic reflector the image comprises a vertex of the parabolic reflector.

Preferably, the first camera is part of a sensor arrangement for tracking the CSP system, wherein said sensor arrangement comprises a housing and the housing comprises the first camera and, preferably, an inclination sensor.

Preferably, the shadow receiver is attached to or only partly contained in but extending from said housing.

The present invention particularly relates to a sensor arrangement for tracking a concentrated solar power system, preferably a solar collector assembly (SCA), the sensor arrangement comprising a housing. Said housing comprising, preferably housing a camera and, preferably, an inclination sensor. The sensor arrangement may also comprise a shadow receiver, which is preferably connected to said housing. More preferably, the shadow receiver is attached to or only partly contained in but extending from said housing. Said shadow receiver is arranged and adapted to receive the, preferably full shadow of a solar system's receiver tube, wherein the camera and the shadow receiver are arranged such that the camera may sense the, preferably full width of the, receiver tube's shadow on the shadow receiver. Preferably, the camera is arranged to sense at least a portion of the reflector of the CSP system, when the sensor arrangement is mounted or fixedly attached to the CSP system.

The sensor arrangement is preferably adapted so as to allow mounting thereof in the area, i.e. in the vicinity, of the vertex of a parabolic trough mirror and to receive the shadow of the receiver tube.

Preferably, the sensor arrangement is adapted so as to allow mounting thereof in the area of the vertex of a parabolic trough mirror outside, in other words behind (when seen from the vertex or focal line's perspective) or underneath (when seen from a gravity point of view with the parabolic trough in its neutral position, e.g. as seen in FIG. 2, middle). The sensor arrangement is then preferably mounted to the support structure, also referred to as torsion box of the parabolic trough, Alternatively, the sensor arrangement may be mounted within the parabolic trough mirror, preferably to a support structure extending from the trough's vertex and supporting the receiver pipe.

The sensor arrangement may comprise at least one, preferably two, preferably substantially parallel, side shield(s). The side shield(s) may extend along at least the whole length and/or height of the housing's sides. The side shield(s) may also be larger than the side of the housing and extend beyond the housing's boundaries. The side shield(s) may be spaced from the housing.

The side shield(s) may protect the sensor arrangement from focused sunlight which possibly hits the sensor arrangement and may lead to overheating. While the sensor arrangement's optimal position is such that it is mainly in the shade, particularly the shade of the receiver tube, the arrangement may be or get in the path of excessive sun reflection, e.g., of secondary focal lines which may occur particularly during start up. This may lead to excessive heat and the risk of damages.

Preferably, each side shield is spaced from the housing by means of at least one spacer. Such spacer may be made of or comprise a heat resistant material with low thermal conductivity, e.g., PTFE. The side shield may be made of metal or alumina.

The side shield may comprise at least three slits. This may increase air circulation, reduction of vibrations as well as avoidance of tension or buckling.

The sensor arrangement's housing is preferably substantially prismatic or box shaped. The camera and the inclination sensor are arranged within said housing. The shadow receiver may be attached to or only partly contained in but extend from said housing.

The shadow receiver preferably is a planar, flat, member. It preferably has a matt finish or colour (for example white, broken white, champagne). It shall, preferably, uniformly reflect the RGB spectrum.

The camera is preferably positioned at an angel to the shadow receiver, said angle preferably being less than 90°, and preferably about 30° to 60°, preferably about 35° to 55°, preferably about 40° to 50°, and, for example, at about 45°, or less.

Said angle may be chosen depending on the given parameters, such as the camera's focal length.

The type of camera may be a single line or multi line CCD or CMOS camera. Multi line may be preferably since it allows analysis of multiple lines, which may be beneficial to recognize and ignore artifacts and/or pollution in the shadow picture. As a camera sensor, for example, SONY Exmor IMX323 sensor, resolution 1920×1080 Pixel, lense:3.6 mm (F:1,4) has proven suitable.

The distance between the camera and the shadow receiver is preferably such that the camera, at least at one point in time of the course of the receiver tube's shadow over the shadow receiver during a day senses the full shadow width of the receiver tube's shadow on the shadow receiver. Due to the advanced image processing algorithm preferably used along with the sensor arrangement of the present invention, is preferred that at one point in time the full width of the shadow on the shadow receiver may be sensed, even if only one side or boundary of the shadow can be sensed and/or even is the shadow is rather diffuse or weak.

The sensor housing may comprise two interfaces, preferably two (BUS-)Interfaces, such as LAN tcp/ip and CAN-BUS.

The sensor housing preferably comprises means for cooling and/or heating the camera and/or the inclination sensor and/or associated electronic components, such as PCBs.

For example, the sensor housing may comprise a heating cartridge or heat pipe for heating components. For optimally distributing the heat, the sensor arrangement may comprise a copper plate. Such copper plate is preferably for conducting heat and/or cold, to and/or from the camera and/or the inclination sensor and/or associated electronic components. It may be made of a different material suitable for conducting heat and/or cold. It preferably connects the camera and/or the inclination sensor and/or associated electronic components with a heat source, such as a heating cartridge, and or cooling component(s). The plate may be about 1 mm thick, may have a width of between about 15 mm and 23 mm, particularly depending to the PCB size and substructure, and/or may have a length of about 195 mm, preferably when being uncoiled, without bends. This may allow efficient temperature control at reasonable price and space consumption.

Alternatively or in addition, the sensor housing may comprise structures to dissipate heat away from the camera and/or the inclination sensor and/or associated electronic components, e.g. a voltage regulator (dc to dc stepper). This may be advantageous in order to prevent overheating of the components in particularly hot environment and/or to obtain optimal operating conditions in hot or cool environments. Also, in areas where there are large temperature shifts between day and night time, freezing of the sensor arrangement at night and/or overheating during day time may be avoided. This assists in both scenarios, operation conditions as well as storing conditions.

Preferably, the housing comprises a main carrier onto which the camera and the inclination sensor are mounted. This assists in improved predefined positioning of the camera with regard to the inclination sensor. In addition, the main carrier may also serve as mounting base for the shadow receiver and/or for mounting the housing to the solar power system. This may further improve accuracy and reliability of the sensor output and thus lead to an improved tracking and thus improved efficiency of the SCA or the solar field.

One or more sensor arrangements, preferably three, is/are mounted to each SCA. The sensor arrangement is controlled by a controller. This may be a local controller, which may, e.g., be located in the solar field and which may, e.g., control two or four SCA's, or a central controller, which may, e.g., control a whole solar field. The central controller may be located locally, in a control building at or close to the solar field, or at a remote location. Communication between the sensor arrangement(s) and the controller may be based on wired or wireless (including the internet) connection. The controller may additionally control tracking of the SCA(s), e.g. by controlling respective mechanic or hydraulic drives, according to a desired temperature of the working fluid. The working fluid temperature is preferably sensed for each SCA by respective temperature sensors, preferably at the fluid inlet into the receiver tube (entry temperature) and at the fluid outlet of the receiver tube (outlet temperature).

The information sensed by the sensors, e.g., images, inclination values etc. is communicated to the controller. Said controller (which may also be a server) may also store individual or all of the sensor date, preferably along with additional operating data of the SCA/solar field. The controller also provides time data, i.e. a system time, which may be allocated to all sensed and/or stored information. This system time is also used to calculate the position of the sun, on which the respective tracking actions are based. The sensor arrangement is used to control the position (tracking angle) of the SCA(s).

The present invention further relates to a CSP system, comprising a reflector, a receiver tube, and a sensor arrangement as disclosed herein. The sensor arrangement is mounted to the CSP system such that the shadow receiver receives the, preferably full, shadow of a the CSP system's receiver tube. The CSP system is configured to determine a degree of soiling of the reflector based on the portion of the reflector sensed by the camera. The CSP system is configured to determine an adjustment of the orientation of the reflector based on the shadow on the shadow receiver sensed by the camera.

The present invention further relates to a method for determining a degree of soiling of a reflector of a CSP system, preferably using a sensor arrangement as disclosed herein. The CSP system preferably is a CSP system as disclosed herein and/or comprises a reflector, a receiver tube and a shadow receiver arranged and adapted to receive the, preferably full, shadow of the receiver tube. The method comprises the steps of acquiring a first image of a reflector of the CSP system, preferably with the camera of the sensor arrangement; identifying a first portion of the first image that comprises the reflector and a second portion of the first image that comprises the shadow receiver; determining a degree of soiling of the reflector based on the first portion of the first image and, preferably, ignoring all information contained in the second portion of the first image for determining said degree of soiling; and determining an adjustment of the orientation of the reflector based on the second portion of the first image and, preferably, ignoring all information contained in the first portion of the first image for determining said adjustment.

Since the method, the CSP system and the sensor arrangement have corresponding features, explanations and technical effects disclosed with regard to features of the CSP system and/or sensor arrangement also apply to the corresponding features method.

Preferably, the method includes setting or adjusting a cleaning routine of the reflector based on the determined degree of soiling.

For example, setting or adjusting the cleaning routine may include setting or adjusting a type and/or a dosage of a cleaning agent and/or a type of a cleaning device and/or a setting of a cleaning device. The type of the cleaning device may, for example, include a cleaning brush, a high-pressure cleaner, a sponge, and/or a cloth. The setting of the cleaning device may, e.g., include a pressure of the high-pressure cleaner. Furthermore, setting or adjusting the cleaning routine may include setting or adjusting an intensity of the cleaning routine.

Preferably, determining the degree of soiling of the reflector comprises identifying dirt patterns in the first image, preferably the first portion of the first image.

Preferably, determining the degree of soiling of the reflector comprises conducting a spectral analysis on the basis of the first image, preferably the first portion of the first image.

Preferably, the method further comprises the step of acquiring a second image of the sky, wherein the determining of the degree of soiling is also based on the second image.

Preferably, determining the degree of soiling comprises identifying a spectral range or spectral ranges that is/are reduced and/or enhanced in the first image, preferably vis-à-vis the second image.

Preferably, the method further comprises the step of determining that the soiling comprises organic soiling by determining that the red-component and/or green-component are/is enhanced in the first image and/or the green component and/or blue component are/is reduced.

Preferably, the method further comprises the step of determining that the soiling comprises mineralic soiling by determining that no spectral range is substantially reduced or enhanced.

The invention further relates to the use of a concentrated solar power (CSP) system's tracking arrangement for determining a degree of soiling of a reflector of the CSP system, wherein, preferably: the CSP system comprises the reflector, a receiver tube, and a shadow receiver arranged and adapted to receive the, preferably full, shadow of the receiver tube; and the tracking arrangement comprises a digital camera arranged and configured to acquire an image of the shadow receiver.

Further preferred embodiments of the invention are exemplarily described in the following with reference to the drawings. These drawings are only schematic illustrations which in order to clarify specific aspects often do not depict other (optional) elements or consider different optional interconnected aspects in one illustration. Equal reference signs refer in this connection to equivalent, similar, comparable or equal components in the illustrated embodiments.

The described embodiments can be modified in many ways within the scope of protection of the claims. It is to be noted that the features of the aforementioned embodiments can be combined in one single embodiment. Depending on their configuration, embodiments of the invention therefore can comprise all or only some of the aforementioned features. The disclosure of the Figures is not intended to restrict the scope of protection of the invention. In the following, preferred embodiments are exemplarily described with reference to the Figures, in which:

BRIEF DESCRIPTION OF THE DRAWINGS

FIG. 7 shows a top view onto a housing, FIG. 8 shows a cross section through the housing of FIG. 7 along line A-A, FIG. 9 shows a side view of said housing, FIG. 13 shows a cross section taken along line D-D in FIG. 10, FIGS. 14*a*, 14*b* and 14*c* exemplary show a shadow falling onto the shadow receiver, wherein FIG. 14*a* shows a receiver tube's shadow entering the shadow receiver from the left, FIG. 14*b* shows a receiver tube's shadow being fully received on shadow receiver, and FIG. 14*c* shows a receiver tube's shadow leaving the shadow receiver to the right, FIG. 29*a* shows an exemplary RGB triplet of a the second image, FIG. 29*b* shows an exemplary RGB triplet of mineralic soiling, and FIG. 29*c* shows an exemplary RGB triplet spectrum of the first portion of the first image.

DETAILED DESCRIPTION OF THE DRAWINGS

Figure 1:
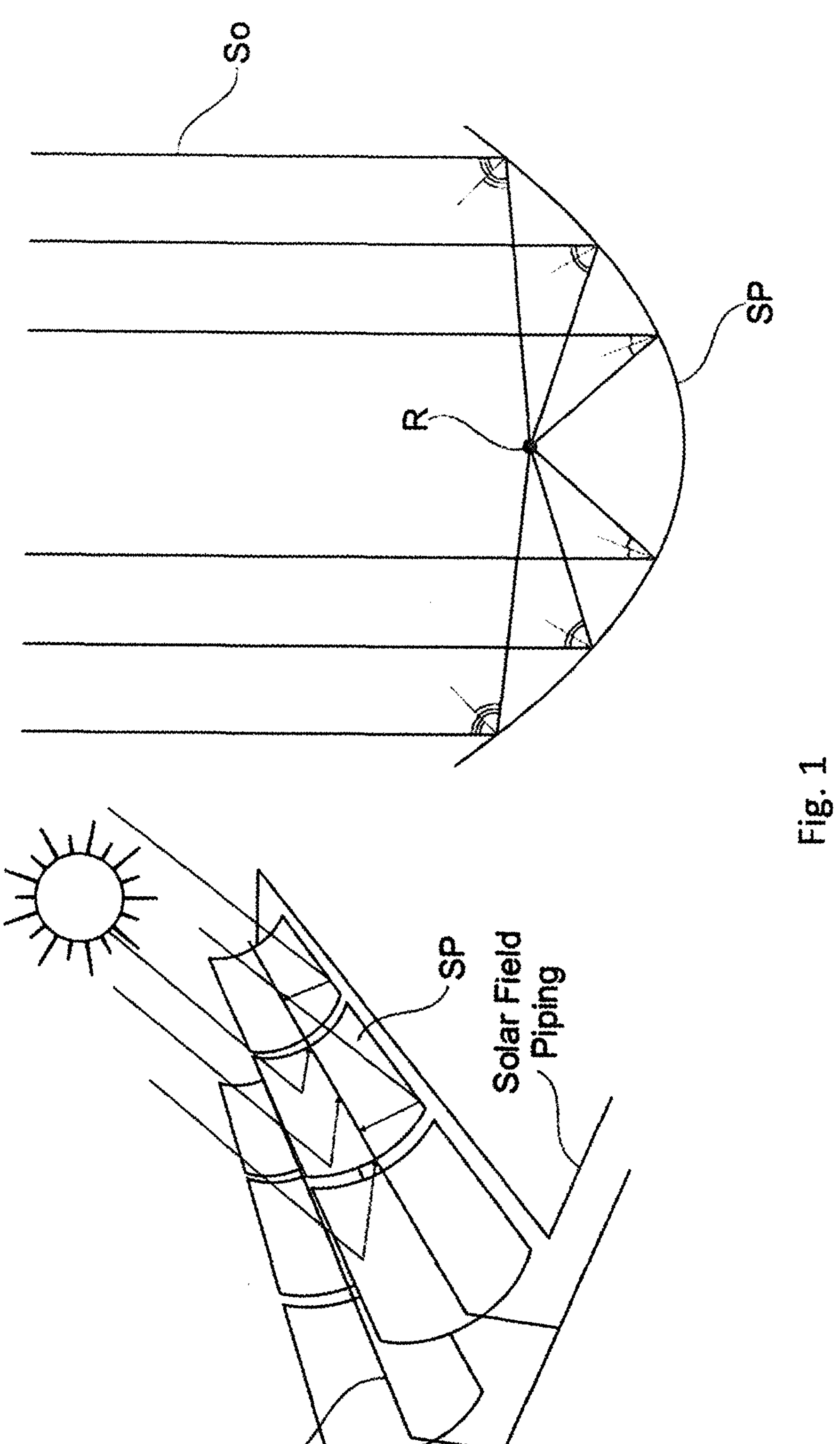
FIG. 1 shows a schematic illustration of a parabolic trough power plant.

As discussed above and in the background of the invention, which also relates to features of and related to the present invention, a system of a parabolic trough, i.e. a solar collector assembly (SCA) is exemplarily shown in FIG. 1. A parabolic trough or solar collector assembly (SCA) comprises a reflector, more precisely a linear parabolic reflector SP made of a number of solar collector modules (SCM) fixed together to move as one SCA that concentrates light onto a receiver positioned along the reflector's focal line. A receiver tube is positioned directly above the middle of the parabolic mirror at its focal line and filled with a working fluid. The reflector follows the sun during the daylight hours by tracking along a single axis. A working fluid such as molten salt or oil is heated to 150-400° C. (oil) or 200-550° C. (molten salt) as it flows through the receiver, from a receiver entry to a receiver exit. The hot fluid can be used for many purposes. Often, it is piped to a heat engine, which uses the heat energy to drive machinery or to generate electricity, or to a thermal energy storage.

Figure 2:
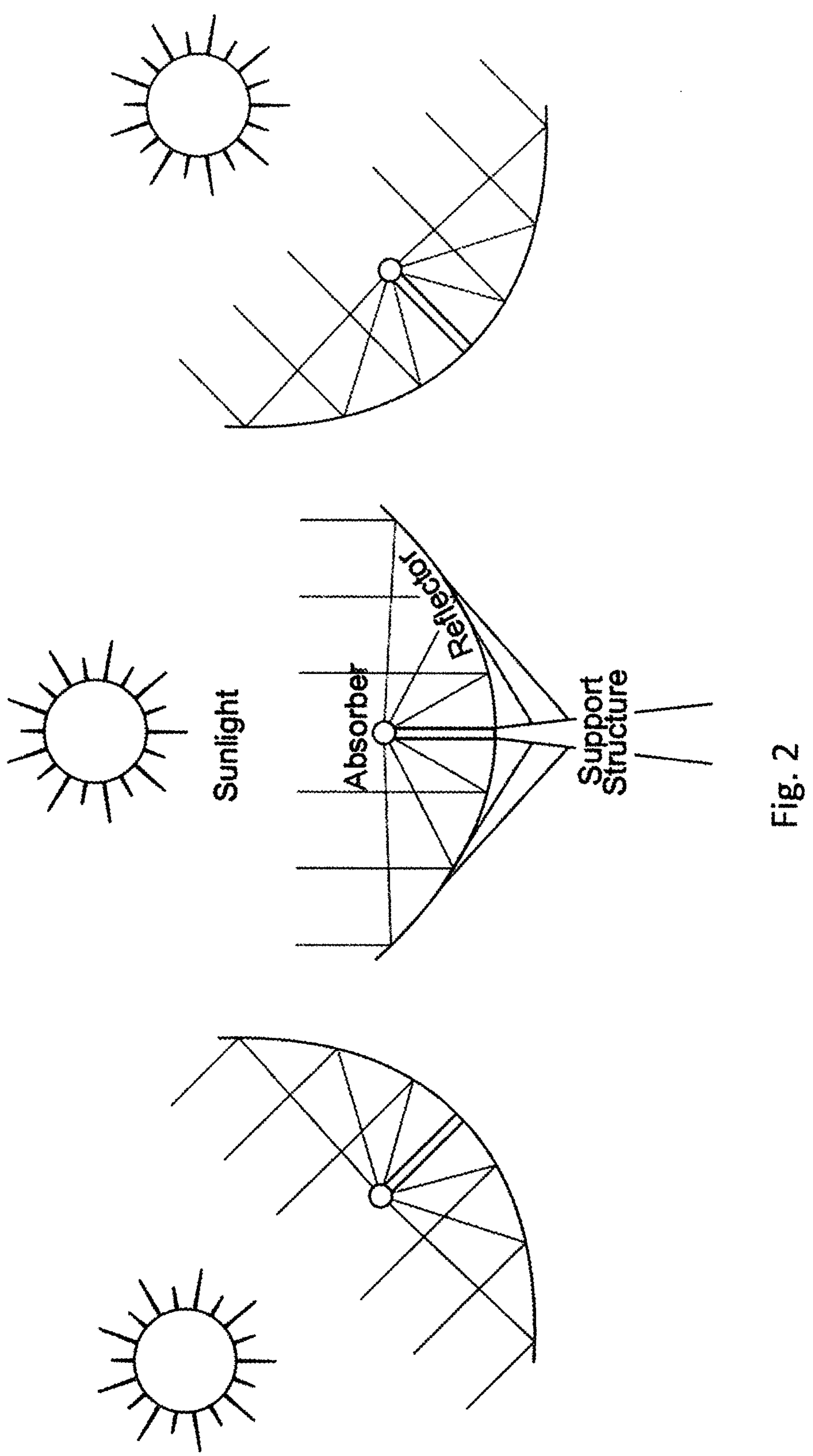
FIG. 2 shows a schematic illustration of its alignment according to the position of the sun.

The parabolic trough is usually aligned on a north-south axis, and rotated, from east to west, to track the sun as it moves across the sky each day (compare FIG. 2).

Figure 3A:
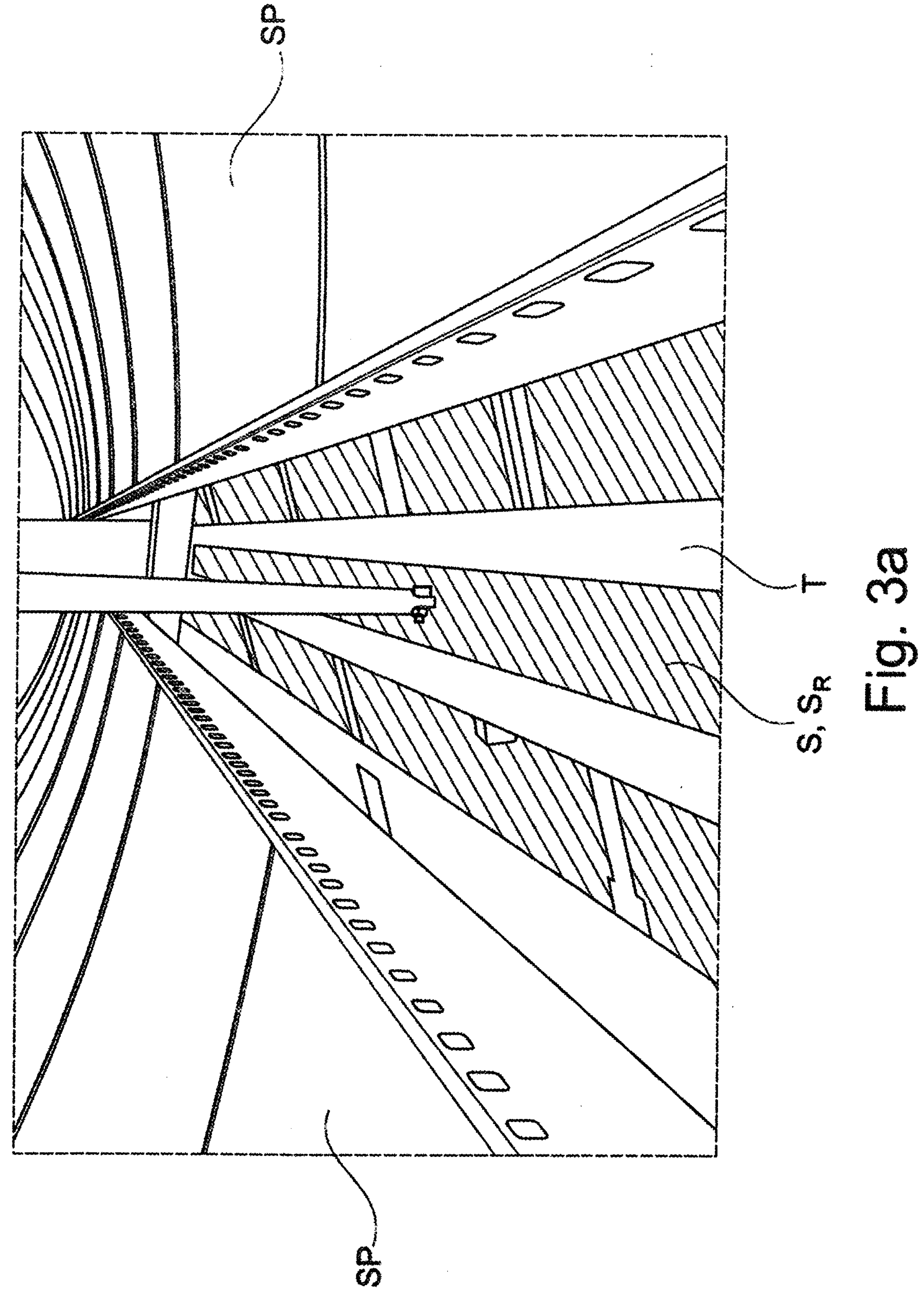
FIG. 3*a* shows an example of the cast shadow of a receiver tube of a parabolic trough in the collector.

FIG. 3*a* illustrates an example of the cast shadow of a receiver tube in the collector. In the shown alignment of the receiver and the collector of an SCA, the shadow S, SR of the receiver tube R (not visible in FIG. 3*a*) is not directly on the collector mirrors but on a beam T of the substructure. In conventional parabolic trough designs, the reflectors are formed of two mirror rows made of curved mirrors or solar collector assemblies SP and arranged symmetrically with respect to a centre line. Please note that, while in FIG. 1 "SP" denotes the reflector, the reference sign "SP" is used in FIGS. 3*a* onwards to specifically denote the curved mirrors or solar collector assemblies of the reflector. The mirrors SP are arranged on opposite sides of a beam T extending centrically longitudinally. When the trough is optimally aligned with respect to the sun, the shadow S, SR of the receiver tube R falls centrically onto the beam, as indicated in the illustration according to FIG. 3*a*.

The shadow may preferably also fall onto a shadow receiver of a sensor arrangement, as will be discussed below. It is clear that any shadow receiver can be used instead of the beam T, which is herein exemplary referred to, particularly in order to explain the general background of the sensing of the receiver tube's shadow.

Figure 3B:
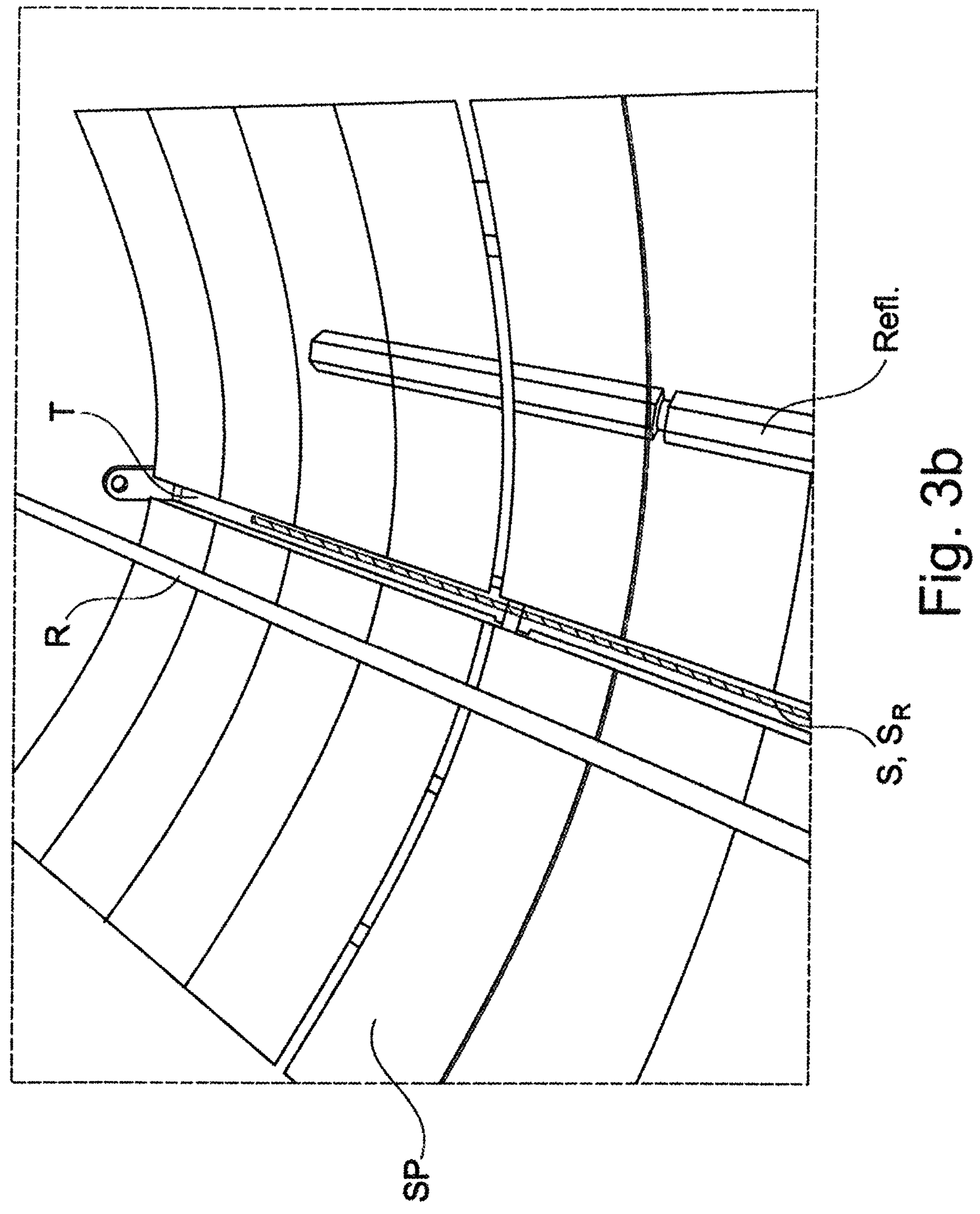
FIG. 3*b* shows a simplified rendered illustration of the cast shadow of a receiver tube of a parabolic trough plant in the collector.
Figure 3C:
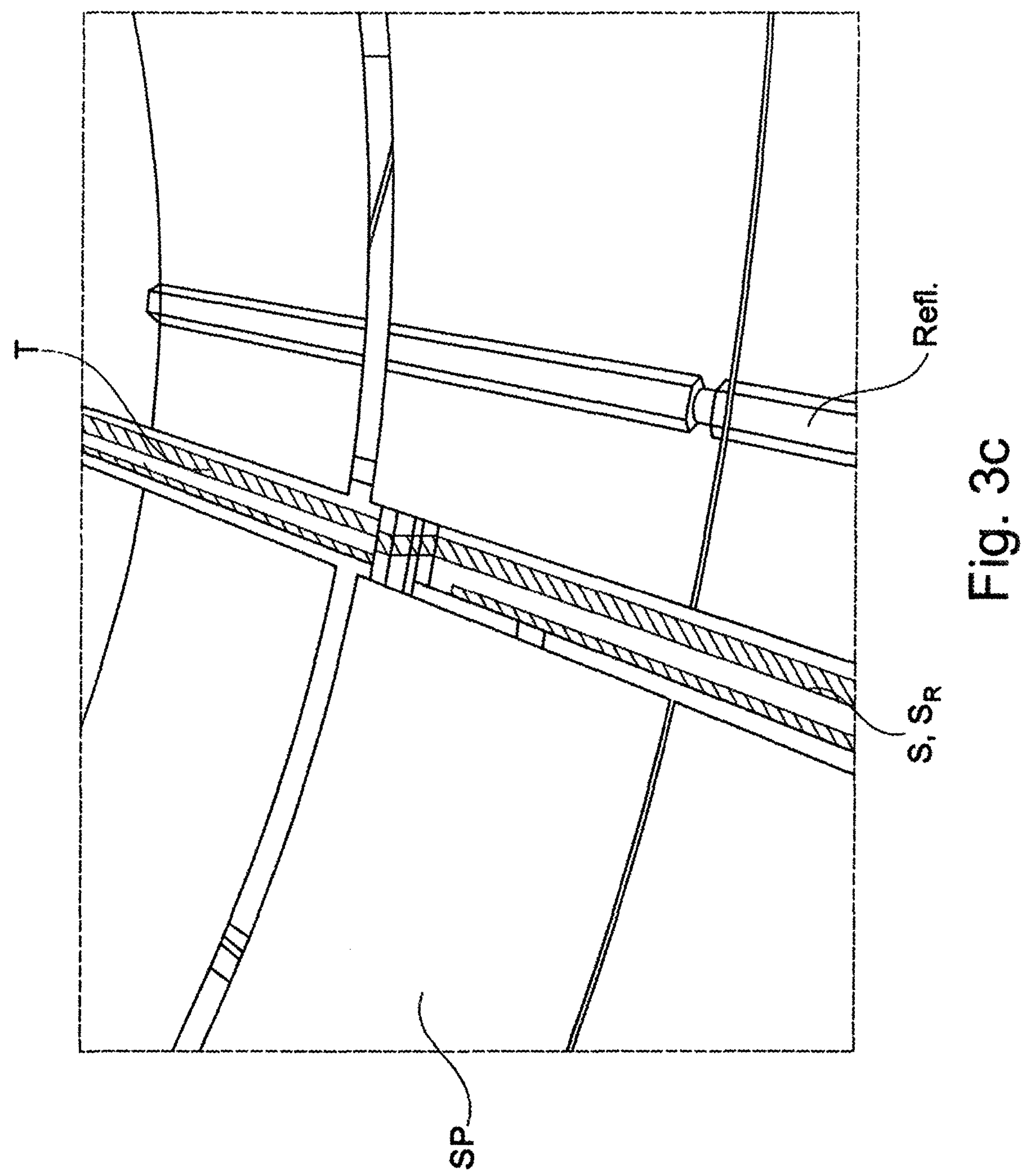
FIG. 3*c* shows a simplified rendered detail of the cast shadow of a receiver tube of a parabolic trough plant in the collector.

The illustration according to FIG. 3*b* shows a scenario according to FIG. 3*a* in a rendered version. Supporting components of the collector arrangement have been omitted (such as, e.g., struts of the receiver tube, which seems to be freely floating but actually is mechanically fixedly positioned by means of a receiver tube support structure) in order to improve the illustration. In addition to the illustration in FIG. 3*a*, FIG. 3*b* reveals the reflection Refl. of the receiver tube R on the mirror SP. This reflection varies depending on the change in the viewer's location, in contrast to the shadow S, $S_R$, which is independent from the position of the viewer. FIG. 3*c* illustrates a detail of the rendered illustration according to FIG. 3*b* in which the receiver tube is not visible.

Figure 3D:
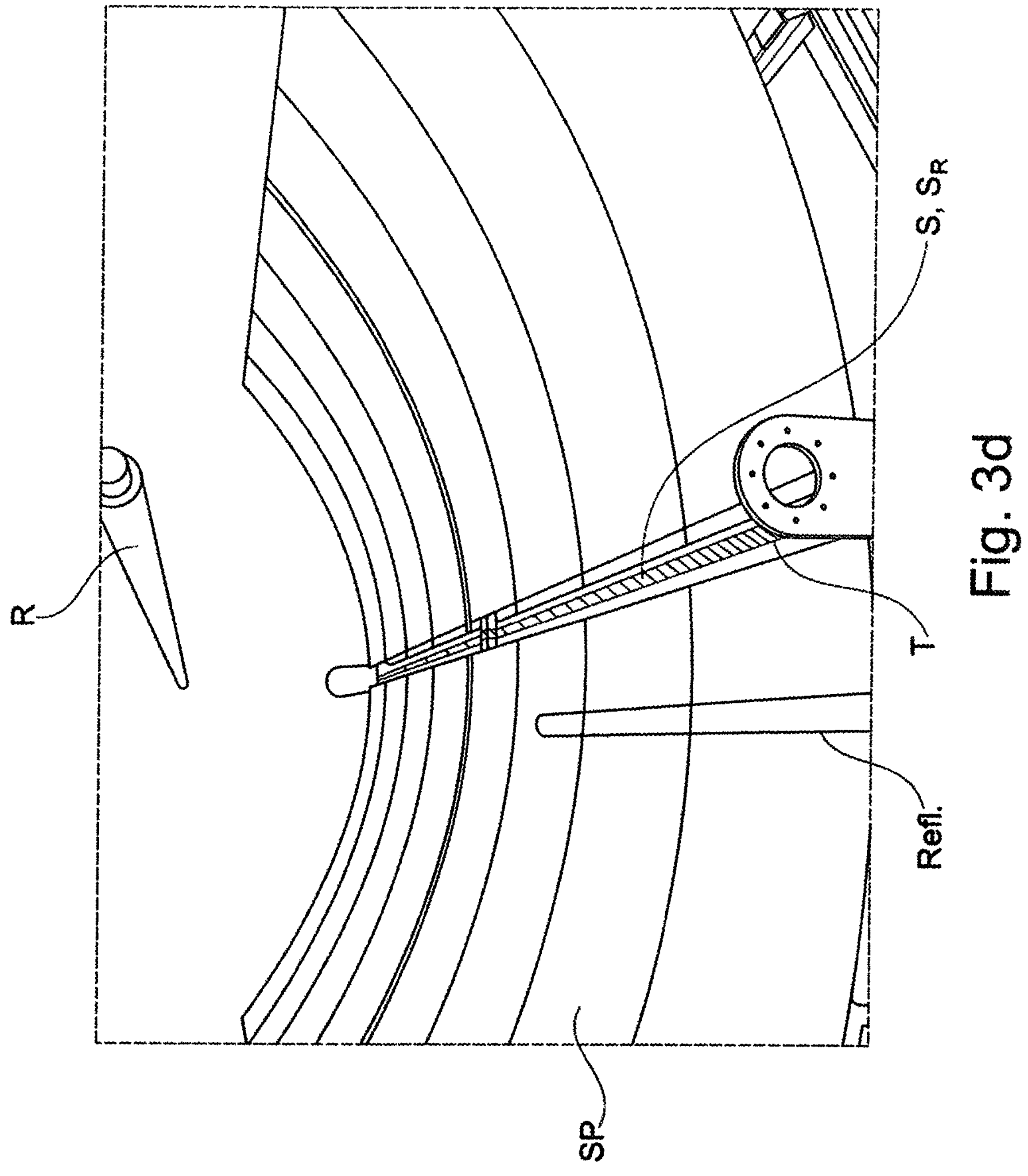
FIG. 3*d* shows a simplified rendered illustration of the cast shadow of a receiver tube of a parabolic trough plant in the collector.

FIG. 3*d* shows a further exemplary view of a scenario according to FIG. 3*a* in a rendered version. Supporting components of the collector arrangement have again been omitted (such as, e.g., struts of the receiver tube, which seems to be freely floating but actually is mechanically fixedly positioned by means of a receiver tube support structure) in order to improve the illustration. FIG. 3*d* also reveals the reflection of the receiver tube R on the mirror SP. Due to the different location of the viewer, the reflection is here at another place.

Figure 3E:
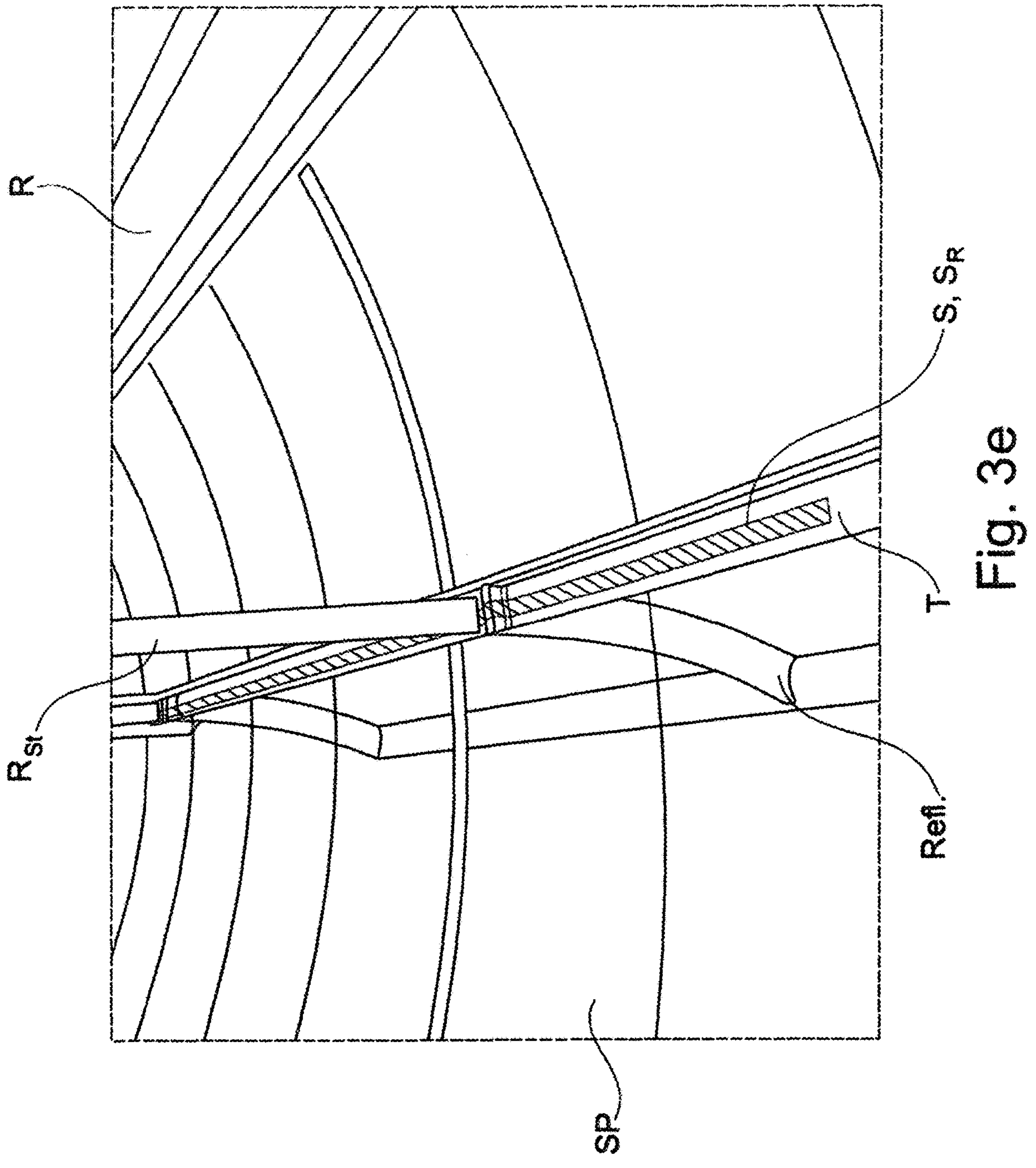
FIG. 3*e* shows a simplified rendered detail of the cast shadow of a receiver tube of a parabolic trough plant in the collector.

FIG. 3*e* shows a detail of a rendered illustration according to FIG. 3*b* or FIG. 3*c* in which struts RST forming a receiver support structure for the receiver tube R can be seen just like respective reflections.

Figure 4:
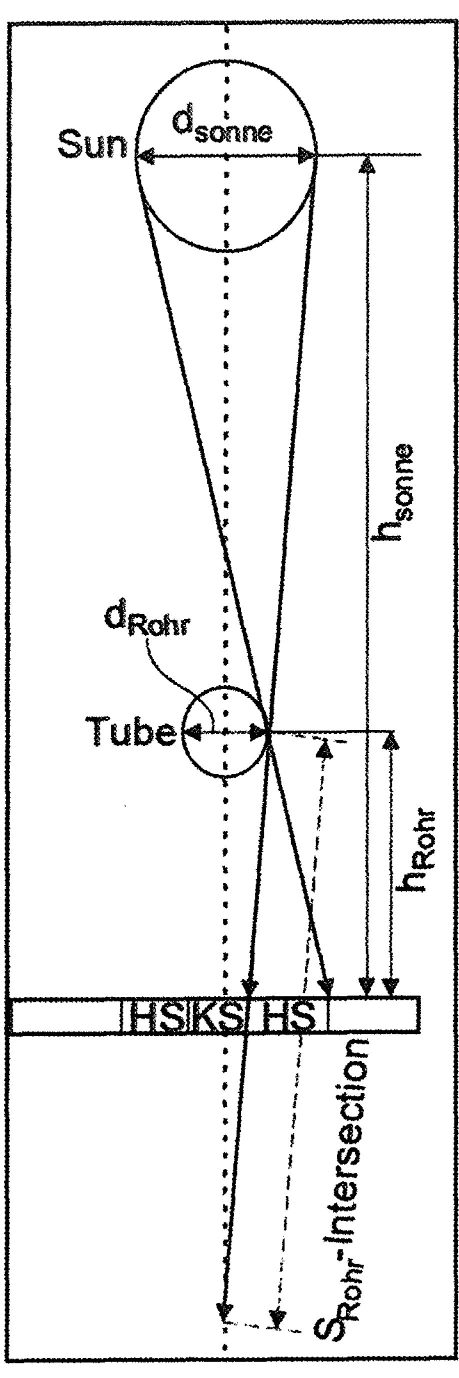
FIG. 4 shows the geometric conditions of the cast shadow using the example of the receiver tube shadow.
Figure 5:
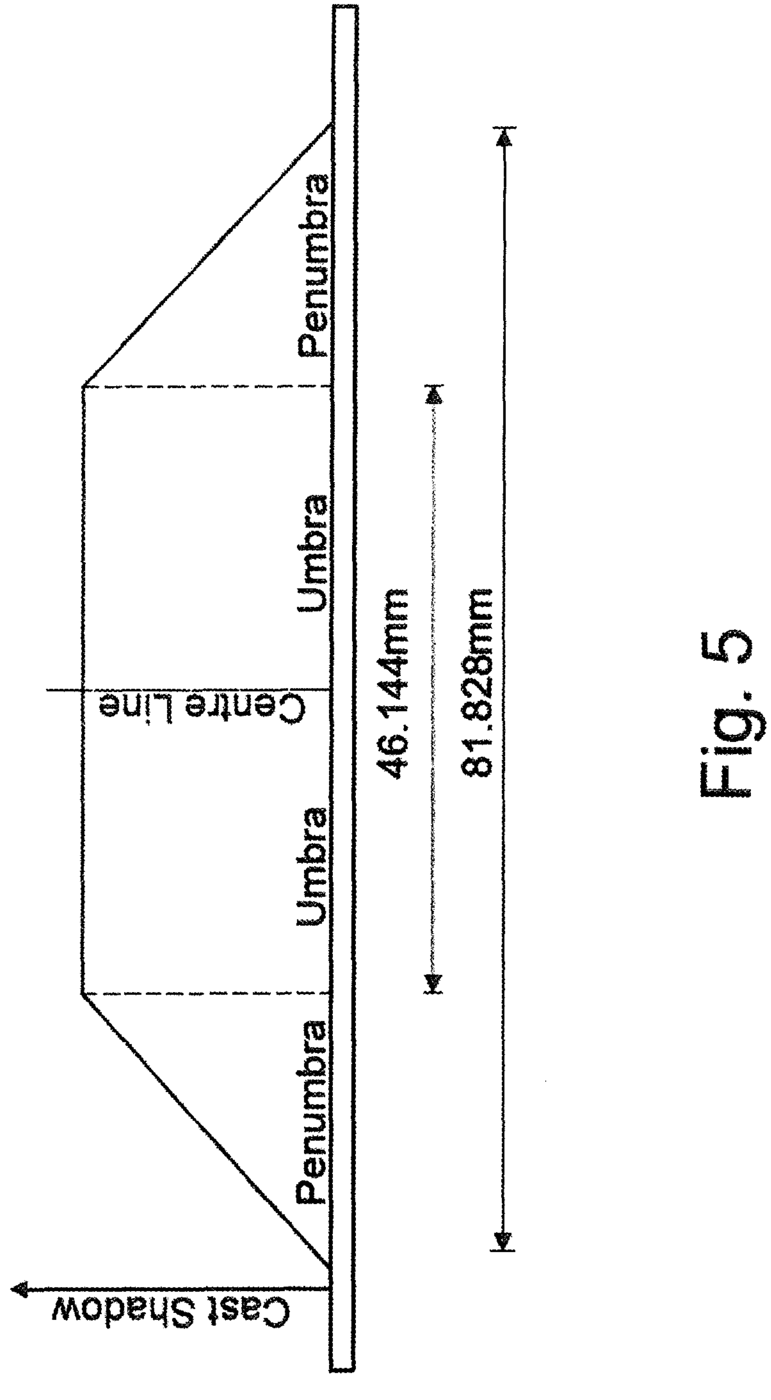
FIG. 5 shows a schematic illustration of an exemplary shadow of the receiver tube on a shadow receiver, wherein the central umbra and the lateral penumbras are highlighted.

FIG. 4 depicts the geometric conditions of the cast shadow by means of the example of the receiver tube shadow and FIG. 5 schematically shows the shadow and explains what is meant by the terms or regions of shadow (umbra) KS and half shadow (penumbra) HS. FIG. 4 depicts the penumbra as the distance resulting on the shadow receiver between the intersections of the shadow receiver with two lines. These lines are the tangents at opposite sides of the sun and a side or point of the receiver, as illustrated in FIG. 4. The illustration in FIG. 4 shows the penumbra at the right side of the illustration. The left penumbra is respectively formed by using the tangents at the opposite side of the receiver tube. The umbra is the region between the penumbras.

The width of the penumbra is dependent on the distance of the shadow blind from the shadow receiver. All shadow parameters can be calculated by means of the sun diameter $d_{Sonne}$, the receiver diameter $d_{Rohr/Receiver}$ (tube diameter in the illustration), the distance $h_{Rohr}$ between the receiver and the shadow receiver, for example the beam T, and the planet distance $h_{Sonne}$ between the sun and the shadow receiver. FIG. 5 exemplarily shows the shadow of the receiver tube on a shadow receiver, wherein the central umbra and the lateral penumbras are highlighted as well as preferred dimensions indicated. The sensor arrangement and method according to present invention analyze the geometry and intensity of the shadow, as it is discussed in WO 2016/107882, the contents of which are incorporated herein by reference, in order to track the SCA.

A CSP system according to the present invention comprises a reflector SP and a receiver tube R as exemplarily shown in and described with respect to FIGS. 1, 2, and 3*a*-3*e*. Furthermore, the CSP system comprises a shadow receiver arranged and adapted to receive the shadow of the receiver tube, preferably the full shadow of the receiver tube. For example, the shadow receiver may be a beam T of the CSP system as shown in FIGS. 3*a*-3*e*. However, also other structures of the CSP system may serve as shadow receiver, and/or the CSP system may comprise a distinguished structure that serves as receiver structure, e.g., the shadow receiver disclosed with regard to the sensor arrangement 1 shown in and described with reference to FIGS. 6 to 26 below.

Furthermore, the CSP system comprises a first digital camera fixedly attached to the CSP system and arranged and configured to acquire a first image of the reflector and the shadow receiver. For example, the first digital camera may be attached at a strut $R_{ST}$ of the receiver tube T or at the receiver tube R itself. The first digital camera may also be part of a sensor arrangement 1 as disclosed in and with reference to FIGS. 6 to 28 below. The first digital camera may be arranged such that the shadow receiver, e.g., the beam T or the receiver 6 of the sensor arrangement 2 disclosed in and with reference to FIGS. 6 to 28 below as well as the reflector SP are recorded by the first camera.

In other words, the CSP system according to the present invention may comprise a sensor arrangement as exemplarily disclosed in and with reference to FIGS. 6 to 26 below, wherein the sensor arrangement comprises the first camera and preferably also the shadow receiver.

The CSP system further comprises a controller. The controller receives data from the first camera, in particular the first image. The controller is, e.g., configured to analyze the first image by image analysis. The controller may be configured to divide the first image into different portions or image areas. The controller may be configured to identify a first portion or image area that comprises the reflector (more precisely an image or representation of the reflector) and a second portion or image area that comprises the shadow receiver (more precisely an image or representation of the shadow receiver). The controller may analyze the first portion of the first image, preferably only the first portion of the first image, to determine a degree of soiling of the reflector. In other words, the controller may preferably ignore all information contained in the second portion of the first image for determining the degree of soiling. Furthermore, the controller may analyze the second portion of the first image, preferably only the second portion of the first image, to determine an adjustment of the orientation of the reflector. In other words, the controller may preferably ignore all information contained in the first portion of the first image for determining the adjustment of the orientation of the reflector.

The controller may be configured to determine the degree of soiling of the reflector as disclosed herein.

Moreover, the CSP system may comprise a second digital camera preferably fixedly attached to the CSP system. For example, the second digital camera is attached to on a pylon in the centre of the solar field. But also at the edge of the solar field. But preferably near the solar field. The second camera is pointed upwards, to take a hemispherical image (140°). The controller is configured to receive data, in particular the second image from the second digital camera and to use the second image as reference image in the analysis of the first portion of the first image as disclosed herein.

For the purpose of determining the deviation of the reflector position from the optimum position and/or an adjustment of the reflector, the position of the shadow of the shadow blind on the shadow receiver, preferably a shadow of the receiver tube on the shadow receiver is determined.

According to the present invention, a first camera 13 and preferably a second camera, preferably an IP camera or IP cameras, is/are used in the sensor arrangement for detecting the shadow on the shadow receiver and for acquiring an image of the sky, respectively. Preferred cameras include line scan cameras or other colour and brightness digitizing sensors.

The determination of two possible deviations is in particular alternatively preferred in the analysis of the shadow. On the one hand, the absolute deviation of the shadow (actual position in comparison to the target position) can be determined, which has an angular deviation, e.g., in degrees, or a position deviation from the centre or the centre line as the result. On the other hand, a deviation can be determined which has only a tendency (e.g., left or right) as the result. Both approaches are preferred and appropriate to reduce and preferably to eliminate deviations in tracking. The image processing of the shadow sensed by the first camera is preferably processed and/or analyzed at a remote location, including a control server or a web-based program.

Figure 6:
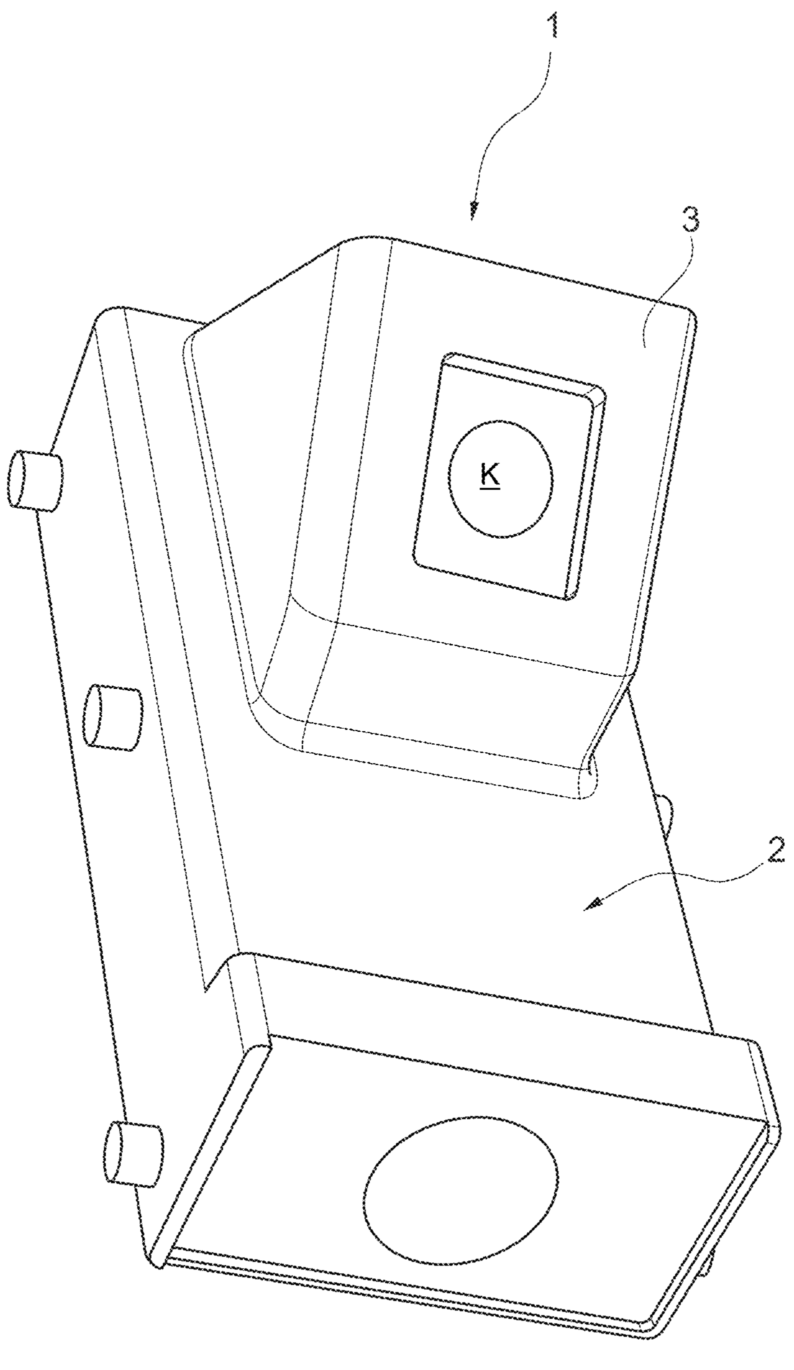
FIG. 6 shows a three dimensional view of an exemplary housing of a sensor arrangement according to the present invention.
Figure 11:
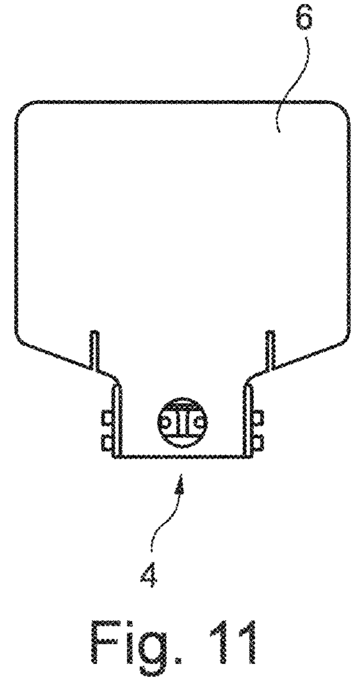
FIG. 11 shows a bottom view of the housing according to FIG. 10.

FIG. 6 shows a three dimensional view of an exemplary housing 2 of a sensor arrangement 1 according to the present invention. FIG. 7 shows a top view onto a housing 2, hatched lines indicating hidden structures. FIG. 8 shows a cross section through the housing of FIG. 7 along line A-A. FIG. 9 shows a side view of said housing, hatched lines indicating hidden structures. Housing 2 is of a generally cuboid or box like shape, preferably provided with a protruding portion 3 for housing and or positioning a first camera 13 (not shown in FIGS. 7 to 16) at its front side 5. The housing preferably provides support for such first camera at an angled position a of preferably about 30° to 60°, preferably about 35° to 55°, preferably about 40° to 50°, and, for example, at about 45° with regard to the, preferably planar, back side 4 and thus positioning plane of the housing. The housing preferably has a length l of preferably about 100 to 250 mm, more preferably of about 150 to 200 mm, for example of about 158 to 163 mm. The housing height h, not including protrusion 3, is preferably about 20 to 50 mm, more preferably about 30 to 40 mm. The height p of protrusion 3 is about 70 to 110 mm, preferably about 85 to 95 mm. The width w of the housing 2 is preferably about 60 to 90 mm, preferably 65 to 85 mm and preferably about 80 mm. These dimensions have proven particularly beneficial as regards limited size and improved options for positioning the housing in an SCA while, at the same time, allowing sufficient space for housing the required components and allowing easy and reliable assembly.

Figure 10:
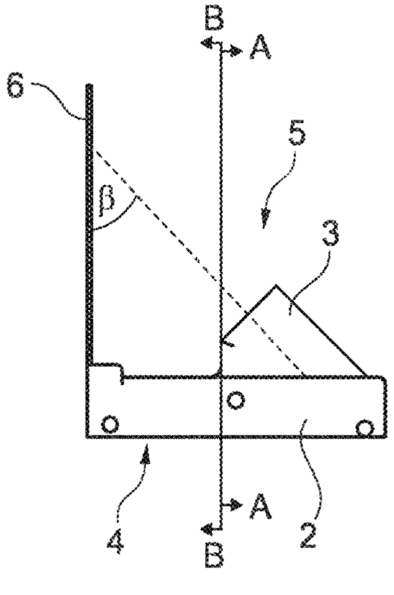
FIG. 10 shows a side view of a housing being provided with a shadow receiver.

FIG. 10 shows a side view of a housing 2 being provided with a shadow receiver 6 at its bottom end, opposite its top end, i.e. the end where protrusion 3 is located. Shadow receiver 6 is particularly well visible in the bottom view according to FIG. 11. Shadow receiver 6 preferably is a planar, flat member of a material or colour suitable to allow recognition of a shadow falling thereon, preferably with good contrast. It preferably has a matt finish or colour (for example white, broken white, champagne).

This particularly allows optimum shadow receiving characteristics for optimized sensing by the first camera. The corrosion resistance of the material is beneficially high. Also, coated materials may be used.

Furthermore, when fixedly attached to the CSP system, preferably a supporting structure of the receiver tube (see, e.g., FIGS. 24 and 26), the first camera of the sensor assembly 1 is configured to acquire the first image such that the first image comprises at least a portion of the shadow receiver 6 and at least a portion of the reflector SP. This is, e.g., shown in and further described with reference to FIGS. 27 and 28 further below.

Thus, from the first image received from the first camera, the controller of the CSP system can identify a first portion comprising the reflector and a second portion comprising the shadow receiver. On the basis of the first and second portions of the first image, the controller can determine a degree of soiling of the reflector and an adjustment of the orientation of the reflector as disclosed herein.

Figure 12:
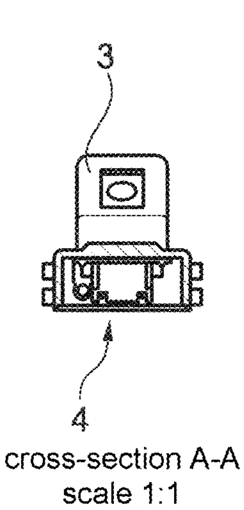
FIG. 12 shows a cross section taken along line C-C in FIG. 10.
Figure 13:
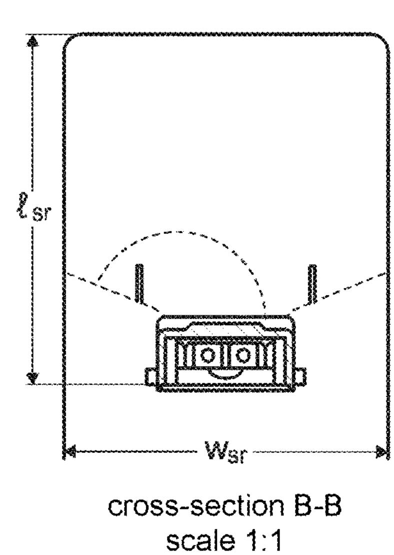

FIG. 12 shows a cross section taken along line A-A in FIG. 10, facing upwards, i.e. away from the shadow receiver 6 towards and just below protrusion 3. FIG. 13 shows a cross section taken along line B-B in FIG. 10, facing downwards, i.e. towards the shadow receiver 6, away from protrusion 3. The shadow receiver 6 extends from the housing 2 in the same direction as protrusion 3. Shadow receiver 6 extends from the housing 2 at an angle of about 90° to its, preferably planar, back side 4 and thus positioning plane of the housing 2. The preferred angle α of the first camera axis, as referred to above, with regard to the preferably planar, back side 4 and thus positioning plane of the housing 2 can therefore be readily translated in an inclination angle β between said shadow receiver 6 and said first camera position and first camera axis, respectively (90°−α). This particularly allows an optimum viewing angle of the shadow received by or falling on the shadow receiver 6 by the first camera as regards quality and size of the image, thus leading to optimized image recognition.

The shadow receiver 6, as measured from the housing's back side 4, preferably has a length lsr of about 120 to 300 mm, preferably 160 to 260 mm and, for example, of about 210 mm. The shadow receiver 6 preferably has a width wsr of about 100 to 300 mm, preferably 160 to 210 mm and, for example, of about 185 mm. The actual dimensions may depend on the receiver tube dimensions and/or the distance between the shadow receiver and the receiver tube. This size particularly ensures sufficient length and width to reliably receive the receiver tube's shadow, so allow a sufficiently large size (particularly length) of the image taken by the first camera to allow optimized image processing, and/or to allow the shadow to move (widthwise) along the shadow receiver 6 while being processed. Also, the shadow receiver is particularly suited to be placed in the above referenced positions on an SCA.

FIGS. 14*a*, 14*b* and 14*c* exemplary show a shadow S falling onto the shadow receiver. FIG. 14*a* shows a receiver tube's shadow $S_R$ entering the shadow receiver 6 with the right border or end 7*a* of said shadow being clearly visible. FIG. 14*b* shows a receiver tube's shadow $S_R$ being fully received on shadow receiver 6 with its right and left borders or ends 7*a*, 7*b* being clearly visible. FIG. 14*c* shows a receiver tube's shadow $S_R$ leaving the shadow receiver 6 with the left border or end 7*b* of said shadow being clearly visible.

Figure 15:
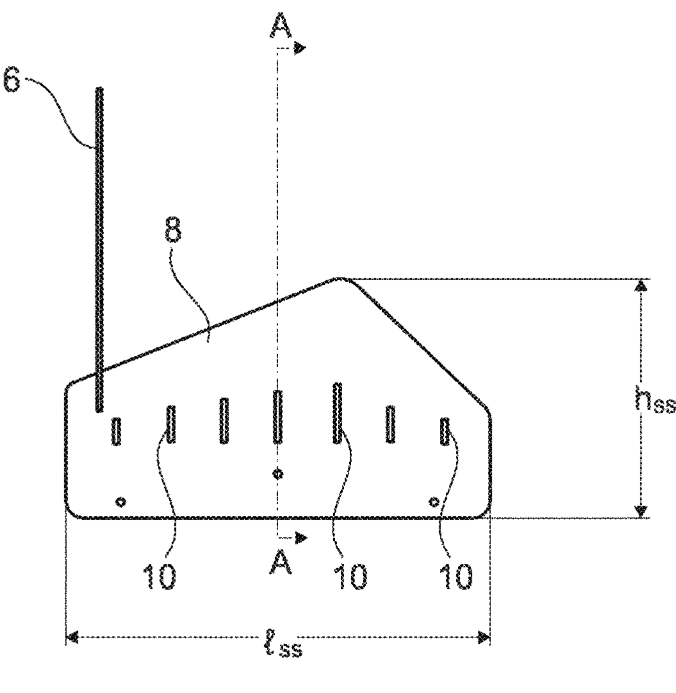
FIG. 15 shows a side view of a housing being provided with a shadow receiver as well as with two side shields 8.
Figure 16:
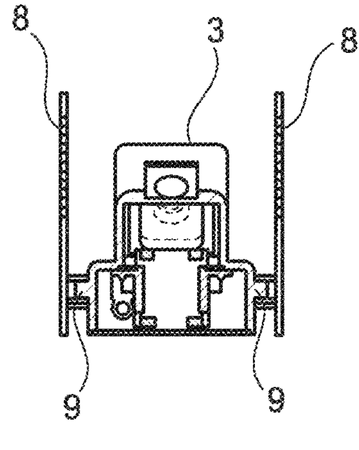
FIG. 16 shows a cross section taken along line A-A in FIG. 15.

FIG. 15 shows a side view of a housing 2 being provided with a shadow receiver 6, as discussed above, as well as with two side shields 8. Side shields 8 are connected to and extend along opposing sides of the housing 2, preferably at an angle of about 90° with the back side 4 and thus positioning plane of the housing 2, and preferably also at an angle of about 90° with the shadow receiver 6 (as visible in FIG. 16). FIG. 16 shows a cross section taken along line A-A in FIG. 15, facing upwards, i.e. away from the shadow receiver 6 towards and through protrusion 3. As can be readily taken from FIG. 16, side shields 8 are preferably parallel to one another. The side shield 8 preferably, extends along at least the whole length and/or height, preferably beyond the housing. In the shown preferred embodiment, the side shield 8 has a length lss of about 100 to 250 mm, preferably of about 150 to 200 mm and preferably of about 185 t 195 mm and/or a maximum height hss of about 90 to 130 mm, preferably of about 105 to 115 mm. Preferably, he side shields 8 are spaced from the housing.

The side shields preferably allow improved shielding of the sensor housing against thermal influences and heat, e.g. induced by secondary focal lines of the SCA.

The side shields 8 are preferably spaced from the housing by means of at least one spacer 9. Said spacer 9 is made of or comprises PTFE. However, other heat resistant materials of low thermal conductivity may alternatively be used. The side shields 8 are preferably made of metal or alumina. This allows an improved insulation of the housing 2 against the heat of the side shields 8 and, preferably, an optimized reflection of heat taken up by the side shields 8.

Preferably, as can be seen in FIG. 15, the side shield 8 comprises at least three, here seven, slits 10. The slits may have differing or the same length and/or width. This may increase air circulation, reduction of vibrations as well as avoidance of tension or buckling.

Figure 17:
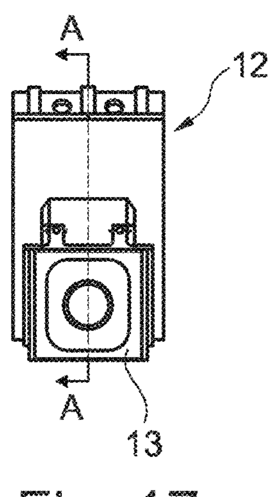
FIG. 17 shows a front view of a main carrier.
Figure 18:
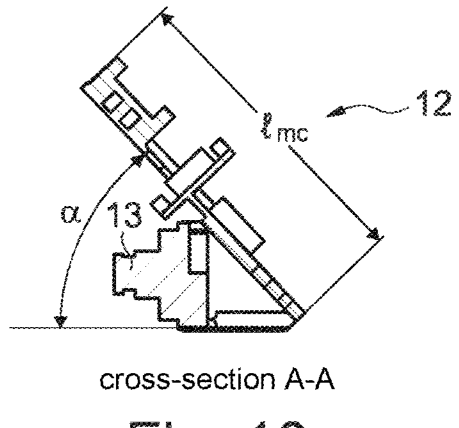
FIG. 18 shows a cross section through the main carrier of FIG. 17 along line A-A.
Figure 19:
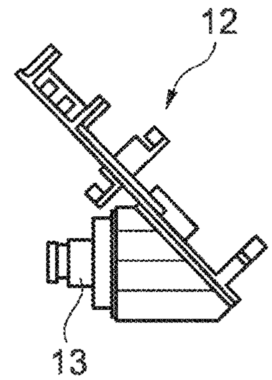
FIG. 19 shows a side view of said main carrier of FIG. 18.

FIG. 17 shows a front view of a main carrier 12. FIG. 18 shows a cross section through the main carrier of FIG. 17 along line A-A. FIG. 19 shows a side view of said main carrier 12. Said main carrier 12 is for being contained in said housing 2 and for supporting components of said sensor arrangement 1. Such components include a first camera 13, an inclination sensor (not shown), interface structures (not shown) and the like. The main carrier 12 may be made of high accuracy and allows improved and stable relative and/or predefined positioning of the components connected thereto, e.g. of the first camera with regard to the inclination sensor. In addition, the main carrier may also serve as mounding base for the shadow receiver and/or for mounting the housing to the solar power system. This may further improve accuracy of the relative positioning of these components with regard to one another and thus reliability of the sensor output, thereby leading to an improved tracking. The length lmc of the main carrier 12 may be about 90 to 130 mm, preferably about 100 to 120 mm and preferably about 112 mm. The angle $\alpha$ between the first camera and the main carrier's longitudinal extension (along which the length lmc is measured, see, e.g. FIG. 18 or 20) is preferably as angle $\alpha$ referred to above with regard to, e.g., FIG. 8.

Figure 20:
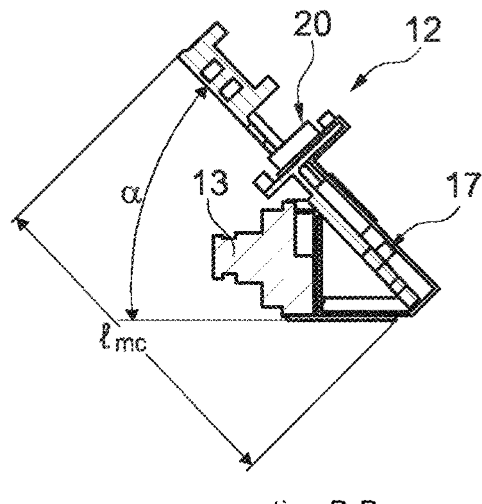
FIG. 20 shows a cross section through a main carrier as in FIG. 17 along line A-A, with a heating element.
Figure 21:
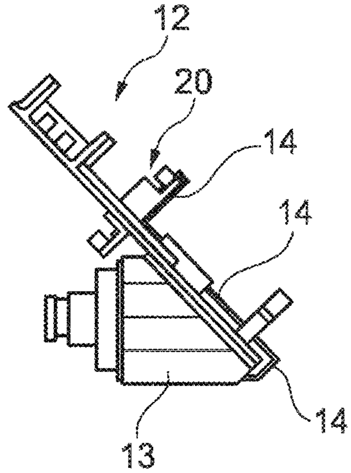
FIG. 21 shows a side view of said main carrier of FIG. 20.

FIG. 20 shows a cross section through a main carrier 12 as in FIG. 17 along line A-A and FIG. 21 a side view of said main carrier 12. Said main carrier 12 basically corresponds to the one shown in and discussed with regard to FIGS. 17, 18 and 19 but also comprises a heating element 14. Said heating element 14 is a plate, preferably a copper plate, which is adapted for transferring heat between and from different positions along the main carrier 12 and the components connected thereto, particularly a first camera 13, an inclination sensor (not shown; preferably mounted at position 20) and other electronic components such as printed circuit boards (PCBs, not shown), converters (not shown) etc. Said heating element 14 may either be directly (functioning as heat pipe) or indirectly (heated by additional heating element and transferring heat) heated to transfer heat to the relevant components of the sensor arrangement. This may assist in ensuring these components to maintain their required storage and/or operating temperature(s).

Figure 22:
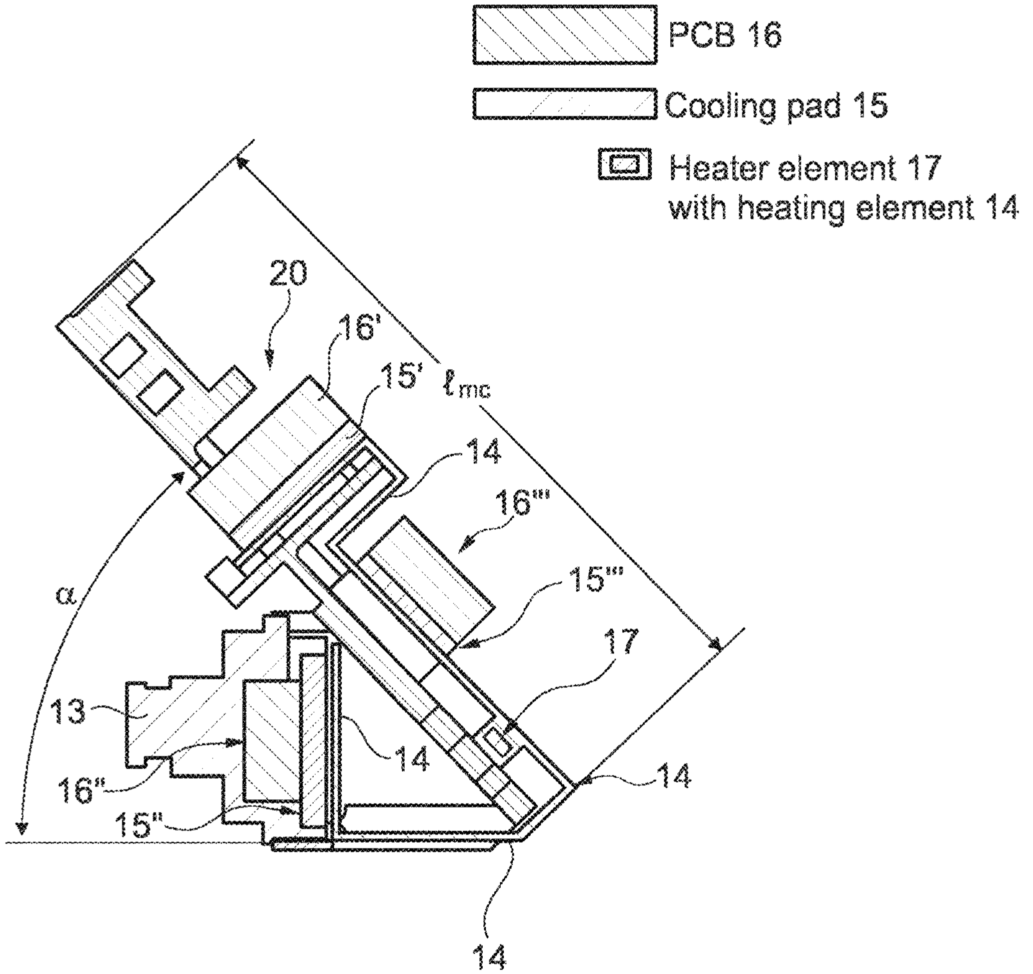
FIG. 22 shows a cross section corresponding to that of FIG. 20, showing main carrier and heating element as well as, additionally, indicating exemplary cooling elements associated to relevant electrical components.

FIG. 22 shows a cross section corresponding to that of FIG. 20, showing main carrier 12 and heating element 14 as well as, additionally, indicating exemplary cooling elements 15 associated to relevant electrical components. For example, a cooling element 15' may be associated with the inclination sensor (not shown, e.g. at position 20) and its PCB (indicated at 16'). A further cooling element 15" may be associated with the first camera 13 and its PCB (indicated at 16"). Moreover, further cooling elements 15 may be allocated to additional electronic components such as, e.g. a cooling element 15'" may be associated with a converter PCB (indicated at 16'"), such as a DC to DC voltage regulator (preferably step down). The heating element 14 is heated by a heater 17 and transports heat to the discussed components. In addition, there may be provided an active or inactive cooling. In the preferred embodiment as discussed, cooling pads 15 allow an improved dissipation of heat and thus cooling of the relevant components.

The sensor arrangement according to the present invention can readily be mounted to an existing SCA or be integrated in new SCAs. It can readily be manufactures at low cost with high accuracy. For example, the shadow receiver may be made as a simple, laser cut part. The sensor housing may be made of a temperature and UV resistant plastic material, which may easily be injection molded at low cost. Accuracy of the housing is of less importance since the relevant parts are supported and positioned relative to one another by the main carrier. No fixation structures etc. for assembling various sensors or other components are required. Moisture absorbance or mechanical loads etc. do not need to be specifically taken care of as regards the housing design. The modular, platform like structure of the sensor assembly is of general advantage and allows mounting of different components as need arises.

The sensor arrangement can readily be mounted to, e.g., the support structure supporting the receiver tube, preferably at a location close to the vertex of the SCA, i.e. at the bottom of and inside the trough. Alternatively, the sensor arrangement may be attached to the supporting structure, such as to a beam T as referred to above or at the position where the beam T is shown in the above discussion and referenced Figures. This is, preferably, in the area of a gap between the SCMs in the area of the vertex of the SCA but outside, i.e. behind or underneath the SCA. Such mounting to the support structure has proven to be of great advantage, noting that the positional accuracy of the support structure with regard to the parabolic mirror arrangement of the SCA is of highest accuracy and since the relative positions of the inclination sensor, the first camera and the shadow receiver are predefined within the sensor arrangement and need not to be altered upon mounting to an SCA in the field, thereby reliably maintaining high positional and sensor accuracy, as already referred to above. Neither highly qualified staff nor specific tools are required for mounting the sensor arrangement.

Figure 23:
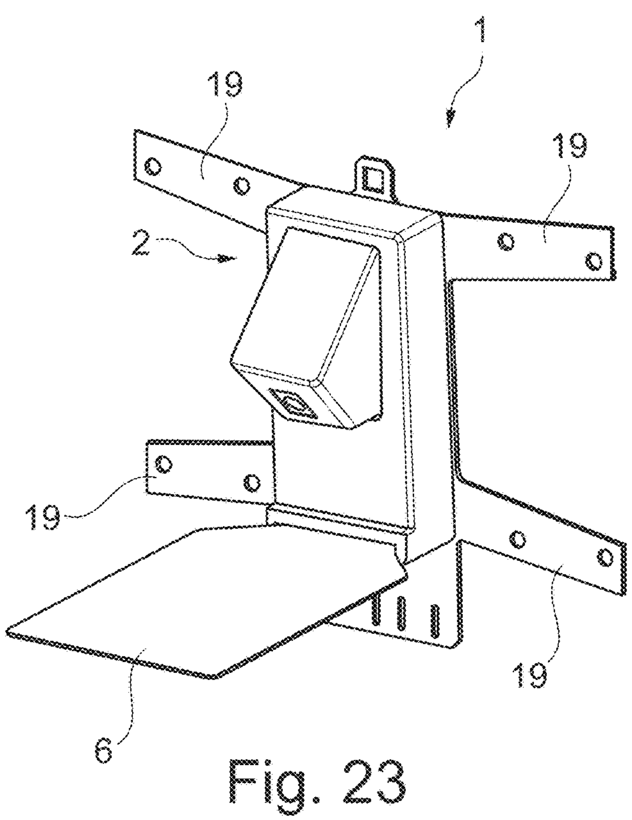
FIG. 23 shows a sensor housing for being mounted to a receiver tube's support structure.
Figure 24:
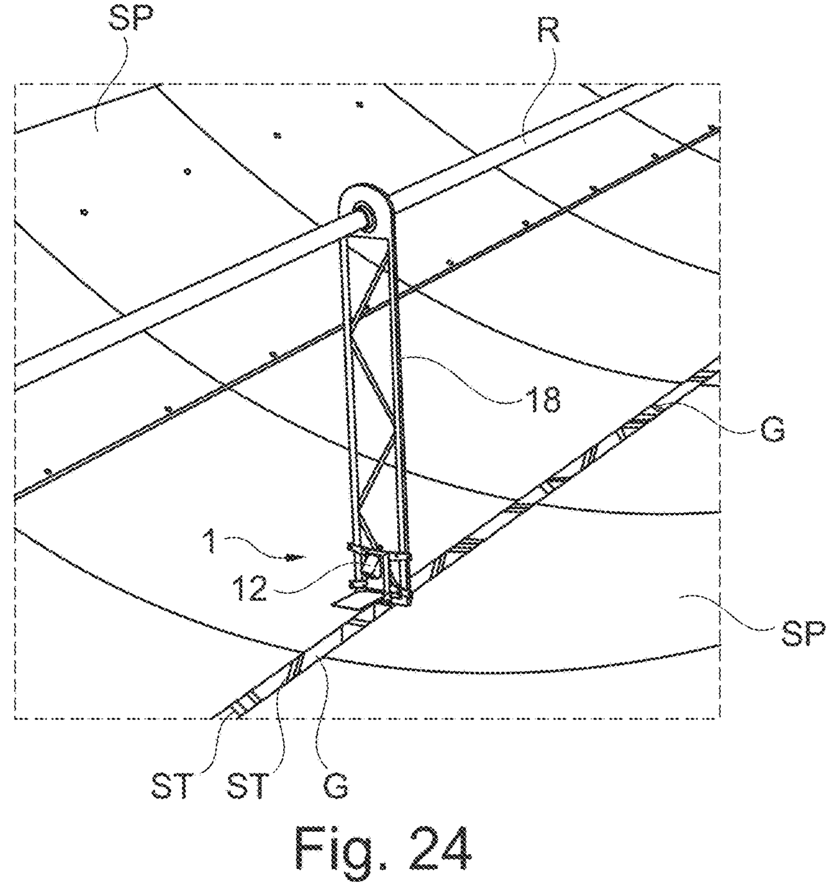
FIG. 24 shows a sensor housing being mounted to a receiver tube's support structure.
Figure 25:
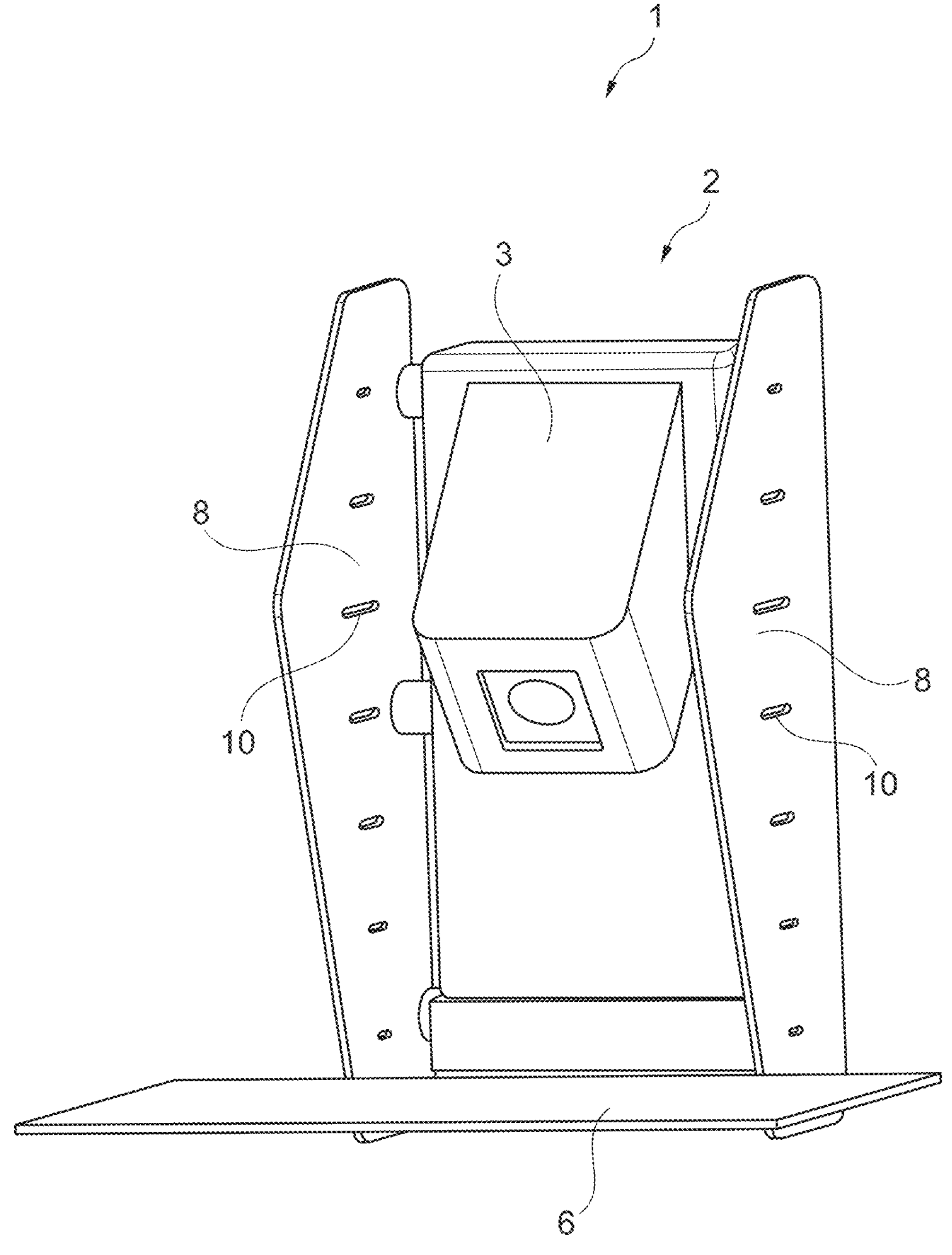
FIG. 25 shows a sensor housing with a shadow receiver and side shields.

FIG. 23 shows a housing 12 (here without side shields, which may, however, advantageously be foreseen) for being mounted to a receiver tube's support structure 18, as shown in FIG. 24, at a position close to the bottom of the SCA's trough, as also addressed before. Said housing 12 is preferably provided with four mounting members 19, extending sideways from both upper and lower corners of the housing, when seen in a front view. FIG. 25 shows a housing 2 with a shadow receiver 6 and side shields 8. Said housing 12 may be mounted to the support structure of an SCA at a position close to the bottom the trough but outside the trough by means of mounting means provided at the housing's back side (not shown).

Figure 26:
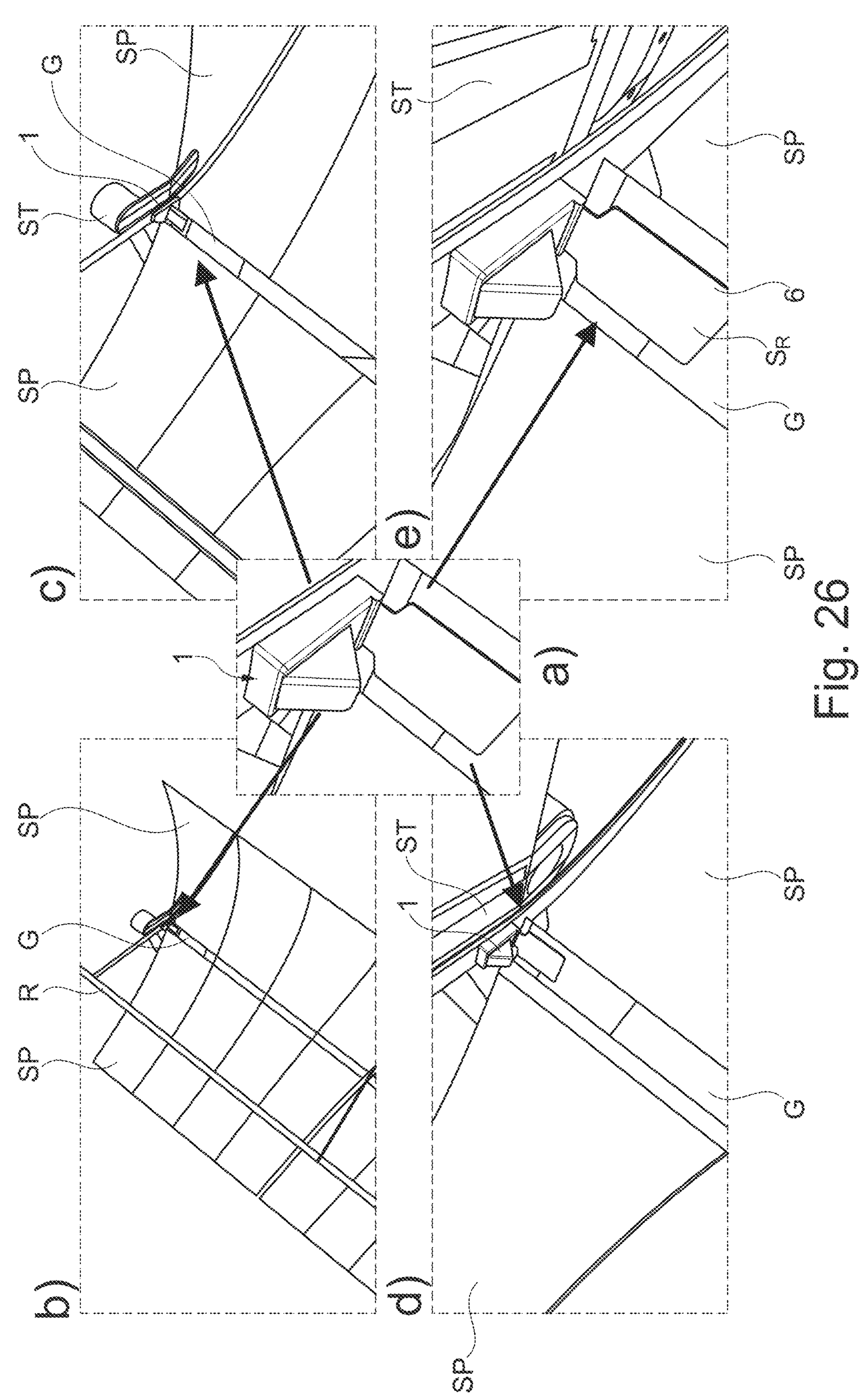
FIG. 26 shows a sensor assembly mounted to a CSP system (FIGS. 28 a) e) showing different framings of the CSP system and the sensor assembly)

Such mounting situation on the support structure of an SCA is visualized in FIG. 26. Said Figure shows, in FIG. 26*a*, a sensor arrangement 1 according to the present invention. Arrows point, from said sensor arrangement 1, to locations/positions on an SCA as shown in FIGS. 26*b*, 26*c*, 26*d* and 26*e*. These Figures show parts of an SCA with mirror elements SP/modules SCMs, a receiver tube R and the gap G gap (as already discussed herein) at the deepest point of the trough. In addition, FIG. 26 indicates the support structure ST (as also already discussed herein), to which the sensor arrangement is mounted. It is to be noted that FIG. 26 shows mounting of the sensor arrangement in the area of the gap P at an end of the parabolic trough. However, mounting thereof, as described before, may also or additionally be effected to the support structure ST, e.g., in the middle of the SCA or distanced from an end thereof.

The housing 12 may comprise a humidity buffer (not shown) for keeping the humidity within the housing in a constant range by either receiving humidity from the ambient air or by providing humidity to the ambient air.

The sensor arrangement according to the present invention as described herein, particularly the combined provision of a modular shadow sensing arrangement by means of a first camera along with an inclination sensor, allows improved tracking of individual SCAs as well as of multiple SCAs in a solar field. Tracking may particularly be made easier and more reliable. In particular, the quality of repetitive positioning of an SCA, closely following the sun and achieving optimized position in relation to the sun, whether at maximum power or at defined reduced power position can be readily achieved. For example, the sensor accuracy of the sensor arrangement of the present invention has proven to be at about 0.003°. In general and depending on the setup of the SCA, the accuracy of the sensor arrangement may exceed the accuracy tracking drive, which is often a hydraulic drive. Still, an optimized absolute position of the SCA with regard to the sun, i.e. optimized tracking, may be achieved by means of the sensor arrangement and method described herein.

An example for a preferred first and/or second camera is a sony exmor imx323 sensor on a PCB in camera hi3516 v200 cctv-ip-camera.

An example for an inclination sensor to be used with the present invention is BWL 315S CAN Bus single-Axis inclinometer.

For example, the sensor arrangement according to the present invention does not need to be specifically referenced or adjusted with regard to the construction of the SCA or with regard to an external reference inclination sensor. Rather, the sensor arrangement according to the present invention may be adjusted/referenced to the sun (and not to a part of the construction or a reference sensor). Such reference can be made at any point in (sun) time.

Since the accuracy of known systems suffers from various disadvantages, such as temperature drift of the sensor(s), age drift of the sensor(s) or other components, change in position of the base/fundament, tensions and resulting position changes of the construction, the adjustment or reference of such systems only lasts for a limited time. Contrary thereto, the present sensor arrangement and the adjustment going along therewith ameliorates or does not suffer from these disadvantages. The requirements for position accuracy upon mounting are low. The adjustment does not need surveillance or observation by skilled personnel. No special equipment is required for mounting, sensing and or adjustment. Also, no additional reference sensor is required. Reference data may be stored centrally, e.g. in a database, and may be considered, also in relation to a solar field, upon demand. The adjustment or referencing may be automatically reiterated within predefined time intervals or upon, preferably automatic, observation of inaccuracies, e.g., based position changes of structural components and/or the base construction.

According to a preferred referencing method as discussed hereinbefore, the present invention moreover relates to a method for adjusting a sensor arrangement for tracking a concentrated solar power system, preferably a solar collector assembly (SCA). The solar system is preferably a system including a sensor arrangement of the invention as referred to above. The method may comprise the steps of mechanically adjusting the sensor arrangement on the CSP system; and/or of thermally adjusting the sensor arrangement together with the CSP system. More particularly, the mechanical adjustment relates to adjusting or referencing the mounting position of the sensor arrangement on a CSP system, in particular, the mounting position of the sensor system on a solar collector assembly (SCA), preferably as referred to above. The thermal adjustment of the sensor arrangement together with the CSP system may particularly involve determining an optimal position(s) of the solar collector assembly (SCA) based on the thermal output of the heating fluid and aligning it with respective sensor data such as inclinometer data, first camera, and/or time data. This may subsequently allow improved tracking and optimized positioning of the SCA to the sun and thus 'harvesting' a maximum of sun energy, i.e. heating the working fluid to the highest possible or to the desired maximum temperature simply based on the receiver tube's shadow by way of image processing and/or the inclination sensor's output.

The method of mechanically referencing the sensor arrangement to the SCA preferably comprises the step of mounting the sensor arrangement to a solar collector assembly (SCA), preferably in the area, i.e. vicinity, of the vertex of the parabolic trough mirror, so as to be able to receive the full width of the shadow of the receiver tube, as already referred to above. Preferably, the sensor arrangement is mounted outside, i.e. behind or under the parabolic trough, preferably to the support structure ST such as the torsion box, or within the parabolic trough, preferably to a support structure 18 supporting the receiver tube. Further steps may include adjusting the SCA and/or the sensor arrangement such that the receiver tube's shadow is received, in its full width, by the sensor's shadow receiver; and/or measuring an inclination value using an inclination sensor contained in the sensor arrangement, as well as taking and storing the time, and preferably date, along with a picture of the full width shadow taken by the first camera contained in the sensor arrangement.

Mounting of the sensor arrangement to the support structure, particularly to the torsion box, allows a reliable and easy securing of the sensor arrangement to the SCA and thus mounting of the sensor arrangement to the SCA in predefined relationship to one another within very low tolerances, preferably of +/−2°, preferably +/−1.5° and more preferably +/−1° or less of the sensor's desired or reference angular position. Similarly, the mounting of the sensor arrangement to the SCA may be effected with a tolerance of in translatory displacement, perpendicular to the tracking axis, of about +/−3-5 mm, preferably about +/−2-3 mm of the sensor's desired or reference position Beneficially, potential translatory displacement orthogonally to the tracking axis may be balanced by the thermal adjustment/referencing, as discussed herein.

Usually, the support structure of an SCA is of high accuracy, particularly since it carries both, the reflector mirrors as well as the receiver tube which have to be mounted in predefined position with regard to one another in order to achieve a high degree of efficiency, as required. Also, the spatial vicinity of the sensor arrangement with regard to the vertex of the parabolic trough of the SCA increases the reliability and accuracy of the sensor's position. Finally, the improved structure of the sensor arrangement, including first camera, inclination sensor and shadow receiver within one unit or housing, and preferably all being carried by one base carrier, improves reliable relative positions and reduces the risk of misalignment.

As a further step of the mechanical adjustment, the SCA is preferably adjusted such that the receiver tube's shadow, including the entire width of the shadow, moves along the shadow receiver, e.g. by moving the SCA from a first maximum inclination to a second maximum inclination or from shadow entry to shadow exit on the shadow receiver, while preferably sensing the shadow received by the shadow receiver and the SCA's angular position data, as well as storing these data obtained by the first camera and the inclination sensor along with associated time data. Time data may be retrieved from a control system to which the sensor arrangement may be connected, as discussed above.

This allows an optimized setting of the sensor arrangement's measurement range as well adjustment of the relative positions of the sensor arrangement and the SCA including its receiver tube with regard to one another. FIGS. 14*a*, 14*b* and 14*c* exemplary show the respective steps of a shadow moving over (here from left to right) the shadow receiver. FIG. 14*a* shows a receiver tube's shadow 7 entering the shadow receiver 6 with the right border or end 7*a* of said shadow being clearly visible. FIG. 14*b* shows a receiver tube's shadow 7 being fully received on shadow receiver 6 with its right and left borders or ends 7*a*, 7*b* being clearly visible. FIG. 14*c* shows a receiver tube's shadow 7 leaving the shadow receiver 6 with the left border or end 7*b* of said shadow being clearly visible.

Along with these steps, information is stored including sensing of the first shadow portion or boundary received on the shadow receiver, also referred to as shadow entry, sensing of the shadow centre, when the full shadow is received on the shadow receiver, and last sensing of the last shadow portion received on the shadow receiver, also referred to as shadow exit, along with the associated angular positions sensed by the inclinometer, the associated picture of the shadow as taken by the first camera, and the associated time, and preferably date, along with further data as required. This allows taking into considerations particularities of the scenario such as point in time and absolute sun position, inclination and absolute position of the SCA, also in view of gravity etc.

These steps are simultaneously performed for all, preferably three, sensor arrangements on one SCA, as already addressed herein. Preferably, the above method steps are performed twice, or at least twice, once from east to west and once from west to east, in other words in opposite directions. This may particularly allow detection of torsion along the parabolic trough and/or directional play in the bearings and or the drive train. Such influences may, once observed, readily be taken into account when interpreting and processing the sensed data in operation of the system, preferably without having to involve complex and expensive maintenance work.

As discussed before, three sensor arrangements are mounted to one SCA, preferably one sensor arrangement at each end of the SCA and one sensor arrangement in the middle of the SCA, as seen along the longitudinal axis of the parabolic trough. This may allow optimized control of the SCA's position along its whole length as well as recognition of, e.g., torsion variations or other artifacts and to thereby improve the system output. If the SCA comprises two, three or more sensor arrangements mounted thereto, the respective method steps apply to two, three, more or all sensors.

Figures 27, 28, 29:
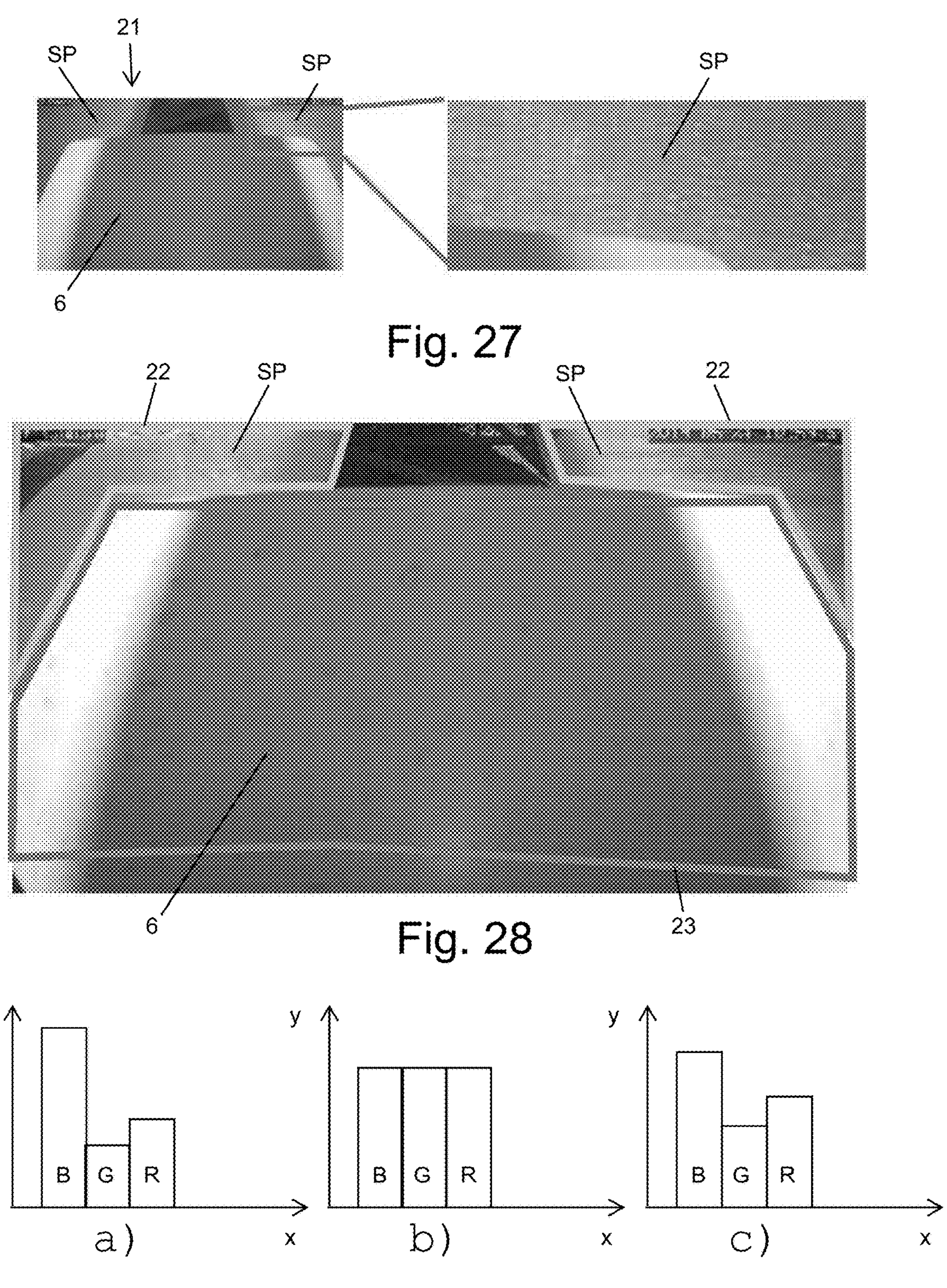
FIG. 27 shows a first image.
FIG. 28 shows a first image that has been processed by the controller.

FIG. 27 shows a first image 21 acquired by the first camera of the invention as well as an enlarged area comprising the reflector. As can be seen, the first image 21 comprises an image or representation of a portion of the reflector, preferably the mirror or collector SP and a portion of the shadow receiver 6.

FIG. 28 schematically shows the first image after it has been processed by the controller of the invention. As can be seen, the controller has identified first portions 22 comprising the reflector, preferably the mirror or collector SP, and a second portion 23 comprising the shadow receiver 6.

In order to illustrate the spectral analysis disclosed herein, FIG. 29*a* shows an exemplary RGB triplet of the second image as described herein, FIG. 29*b* shows an exemplary RGB triplet of mineralic soiling, and FIG. 29*c* shows an exemplary RGB triplet of the first portion of the first image.

In FIGS. 29*a* to 29*c*, the x axis relates to wavelength and the y axis relates to the size of the RGB components.

In theory, the RGB triplet shown in FIG. 29*c* is a superposition of the RGB triplets shown in FIGS. 29*a* and 29*b*.

However, in practice, the RGB triplets shown in FIGS. 29*a* and 29*c* may be on the basis of the second image of the second camera and the first portion of the first image of the first camera, respectively. The controller may be configured to determine the RGB triplet shown in FIG. 29*b* on the basis of the RGB triplets shown in FIGS. 29*a* and 29*c*. Moreover, in order to determine the degree and/or nature of the soiling, the controller may be configured to process the RGB triplets shown in FIGS. 29*a* and 29*c*. For example, the controller may be configured to solve a set of equations that is based on the RGB triplets shown in FIGS. 29*a* and 29*c*.

In order to determine the degree and/or nature of the soiling, it may be taken into account that the reflective coating of the reflector is provided on a back side of the reflector's glas panel. Thus, the soiling may have have an impact on the light entering into the glas panel and on the light that has been reflected by the reflective coating and that is exiting the glas panel.

Preferable alternative and/or additional features of the present invention can be deduced from the following preferred items:

1. Concentrated solar power (CSP) system, comprising:
   - a reflector;
   - a receiver tube;
   - a shadow receiver arranged and adapted to receive the, preferably full, shadow of the receiver tube;
   - a first digital camera fixedly attached to the CSP system and arranged and configured to acquire a first image of the reflector and of the shadow receiver; and
   - a controller configured to:
     - identify a first portion of the first image that comprises the reflector and a second portion of the first image that comprises the shadow receiver;
     - determine a degree of soiling of the reflector based on the first portion of the first image and, preferably, ignore all information contained in the second portion of the first image for determining said degree of soiling; and
     - determine an adjustment of the orientation of the reflector based on the second portion of the first image and, preferably, ignore all information contained in the first portion of the first image for determining said adjustment.

2. CSP system according to any one of the preceding items, wherein the controller is configured to identify dirt patterns in the first image, preferably the first portion of the first image.
3. CSP system according to any one of the preceding items, wherein the controller is configured to conduct a spectral analysis on the basis of the first image, preferably the first portion of the first image.
4. CSP system according to item 3, further comprising a second digital camera, preferably fixedly attached to the CSP system, configured to acquire a second image of the sky;

wherein the controller is configured to determine the degree of soiling also on the basis of the second image.

5. CSP system according to item 4, wherein the first digital camera and the second digital camera have the same type of imaging sensor.
6. CSP system according to any one of items 3 to 5, wherein the controller is configured to identify a spectral range or spectral ranges that is/are reduced and/or enhanced in the first image, preferably vis-à-vis the second image.
7. CPS system according to item 6, wherein the controller is configured to determine that the soiling comprises organic soiling by determining that the red-component and/or green-component are/is enhanced in the first image and/or the green component and/or blue component are/is reduced.
8. CSP system according to item 6 or 7, wherein the controller is configured to determine that the soiling comprises mineralic soiling by determining that no spectral range is substantially reduced or enhanced.
9. CSP system according to any one of the preceding items, wherein the reflector is a parabolic reflector; and wherein the image comprises an apex of the parabolic reflector.

10. CSP system according to any one of the preceding items, wherein the first camera is part of a sensor arrangement for tracking the CSP system, wherein said sensor arrangement comprises a housing;

wherein the housing comprises the first camera and, preferably, an inclination sensor.

11. CSP system according to item 10, wherein the shadow receiver is attached to or only partly contained in but extending from said housing.
12. Sensor arrangement for being mounted to a concentrated solar power (CSP) system, preferably to the CSP system of any one of the preceding items, for tracking the CSP system and for determining a degree of soiling of a reflector of the CSP system, the sensor arrangement comprising:

a housing comprising a camera and, preferably, an inclination sensor, the camera preferably being the first digital camera of the CSP system;

a shadow receiver attached to or only partly contained in but extending from said housing;

wherein the shadow receiver is arranged and adapted to receive the, preferably full, shadow of a solar system's receiver tube;

wherein the camera and the shadow receiver are arranged such that the camera may sense the, preferably full width of the, receiver tube's shadow on the shadow receiver;

wherein the camera is arranged to sense at least a portion of the reflector of the CSP system, when the sensor arrangement is mounted to the CSP system.

13. Sensor arrangement according to item 12, wherein the sensor arrangement is adapted so as to allow mounting thereof in the area of the apex of a parabolic trough mirror and to receive the shadow of the receiver tube.
14. Sensor arrangement according to item 12 or 13, wherein the sensor arrangement is adapted so as to allow mounting thereof in the area of the apex of a parabolic trough mirror outside the parabolic trough to its support structure, or within the parabolic trough mirror to a support structure supporting the receiver tube.
15. Sensor arrangement according to any one of items 12 to 14, wherein the sensor arrangement comprises at least one, preferably two side shield(s), wherein the side shield, preferably, extends along at least the whole length and/or height of the housing, and wherein the side shield is(are) spaced from the housing.
16. Sensor arrangement according to item 15, wherein the at least one side shield is spaced from the housing by means of at least one spacer, wherein, preferably, the spacer is made of or comprises a heat resisting material with low thermal conductivity.
17. Sensor arrangement according to any one of items 12 to 16, wherein the side shield comprises at least three, preferably five, and preferably seven slits.
18. Sensor arrangement according to any one of items 12 to 17, wherein the camera is positioned at an angel to the shadow receiver, said angle preferably being less than 90°, and preferably about 45°.
19. Sensor arrangement according to any one of items 12 to 18, wherein the sensor housing comprises means for cooling and/or heating the camera and/or the inclination sensor and/or associated electronic components.
20. Sensor arrangement according to any one of items 12 to 19, wherein the sensor housing comprises a copper plate, preferably for conducting heat to the camera and/or the inclination sensor and/or associated electronic components, and wherein the sensor housing comprises structures to dissipate heat away from the camera and/or the inclination sensor and/or associated electronic components.
21. Sensor arrangement according to any one of items 12 to 20, wherein the housing comprises a main carrier onto which the camera and the inclination sensor are mounted.
22. Concentrated solar power (CSP) system, comprising a reflector, a receiver tube, and a sensor arrangement according to any one of items 12 to 21;

wherein the sensor arrangement is mounted to the CSP system such that the shadow receiver receives the, preferably full, shadow of a the CSP system's receiver tube;

wherein the CSP system is configured to determine a degree of soiling of the reflector based on the portion of the reflector sensed by the camera; and wherein the CSP system is configured to determine an adjustment of the orientation of the reflector based on the shadow on the shadow receiver sensed by the camera.

23. Method for determining a degree of soiling of a reflector of a concentrated solar power (CSP) system, preferably using a sensor arrangement according to any one of items 12 to 20, the CSP system comprising a reflector, a receiver tube and a shadow receiver arranged and adapted to receive the, preferably full, shadow of the receiver tube, the method comprising:

acquiring a first image of a reflector of the CSP system, preferably with the camera of the sensor arrangement;

identifying a first portion of the first image that comprises the reflector and a second portion of the first image that comprises the shadow receiver;

determining a degree of soiling of the reflector based on the first portion of the first image and, preferably, ignoring all information contained in the second portion of the first image for determining said degree of soiling; and determining an adjustment of the orientation of the reflector based on the second portion of the first image and, preferably, ignoring all information contained in the first portion of the first image for determining said adjustment.

24. Method according to item 23, wherein determining the degree of soiling of the reflector comprises identifying dirt patterns in the first image, preferably the first portion of the first image.

25. Method according to item 23 or 24, wherein determining the degree of soiling of the reflector comprises conducting a spectral analysis on the basis of the first image, preferably the first portion of the first image.

26. Method according to any one of items 25, further comprising the step:

acquiring a second image of the sky;

wherein the determining of the degree of soiling is also based on the second image.

27. Method according to item 25 or 26, wherein determining the degree of soiling comprises identifying a spectral range or spectral ranges that is/are reduced and/or enhanced in the first image, preferably vis-à-vis the second image.

28. Method according to item 27, further comprising the step:

determining that the soiling comprises organic soiling by determining that the red-component and/or green-component are/is enhanced in the first image and/or the green component and/or blue component are/is reduced.

29. Method according to item 27 or 28, further comprising the step:

determining that the soiling comprises mineralic soiling by determining that no spectral range is substantially reduced or enhanced.

30. A computer program or a computer-readable medium comprising instructions which, when executed by a computer, cause the computer to carry out the method of any one of items 23 to 29.

31. A computer system comprising means for carrying out the method of any one of items 23 to 29.

32. Use of a concentrated solar power (CSP) system's tracking arrangement for determining a degree of soiling of a reflector of the CSP system, wherein, preferably:

the CSP system comprises the reflector, a receiver tube, and a shadow receiver arranged and adapted to receive the, preferably full, shadow of the receiver tube; and the tracking arrangement comprises a digital camera arranged and configured to acquire an image of the shadow receiver.

Preferable alternative and/or additional features of the present invention can be deduced from the following preferred aspects:

1. Sensor arrangement for tracking a concentrated solar power system, preferably a solar collector assembly the sensor arrangement comprising a housing; said housing comprising an inclination sensor and a camera; said sensor arrangement being suitable for receiving and/or cooperating with a shadow receiver; said shadow receiver being arranged and adapted to receive the, preferably full, shadow of a solar system's receiver tube, wherein the camera and the shadow receiver are arranged such that the camera may sense the, preferably full width of the, receiver tube's shadow on the shadow receiver.

2. Sensor arrangement according to the preceding aspect, wherein the sensor arrangement is adapted so as to allow mounting thereof in the area of the vertex of a parabolic trough mirror and to receive the shadow of the receiver tube.

3. Sensor arrangement according to any one of the preceding aspects, wherein the sensor arrangement is adapted so as to allow mounting thereof in the area of the vertex of a parabolic trough mirror outside the parabolic trough, preferably to the support structure, or within the parabolic trough mirror, preferably to a support structure supporting the receiver tube.

4. Sensor arrangement according to any one of the preceding aspects, wherein the sensor arrangement comprises at least one, preferably two, preferably substantially parallel, side shield(s), wherein the side shield, preferably, extends along at least the whole length and/or height of the housing, and/or wherein, preferably, the side shield is(are) spaced from the housing. 5. Sensor arrangement according to any one of the preceding aspects, wherein the side shield is spaced from the housing by means of at least one spacer, wherein, preferably, the spacers is made of or comprises a heat resisting material with low thermal conductivity, e.g., PTFE, and/or wherein, preferably, the side shield is made of metal or alumina.

6. Sensor arrangement according to any one of the preceding aspects, wherein the side shield comprises at least three, preferably five, and preferably seven slits.

7. Sensor arrangement according to any one of the preceding aspects, wherein the housing is substantially cuboid or box shaped, and wherein the camera and the inclination sensor are arranged within said housing and wherein the shadow receiver is attached to (and/or only partly contained in but extends from) and extends from said housing.

8. Sensor arrangement according to any one of the preceding aspects, wherein the shadow receiver is a planar, flat, member, preferably having a matt surface finish.

9. Sensor arrangement according to any one of the preceding aspects, wherein the camera is positioned at an angel to the shadow receiver, said angle preferably being less than 90°, and preferably about 45°.

10. Sensor arrangement according to any one of the preceding aspects, wherein the distance between the camera and the shadow receiver is such that the camera, at least at one point in time on one day senses the full shadow width of the receiver tube's shadow on the shadow receiver.

11. Sensor arrangement according to any one of the preceding aspects, wherein the sensor housing comprises two interfaces, preferably two BUS-Interfaces.

12. Sensor arrangement according to any one of the preceding aspects, wherein the sensor housing comprises means for cooling and/or heating the camera and/or the inclination sensor and/or associated electronic components.

13. Sensor arrangement according to any one of the preceding aspects, wherein the sensor housing comprises means for cooling and/or heating the camera and/or the inclination sensor and/or associated electronic components 14. Sensor arrangement according to any one of the preceding aspects, wherein the sensor housing comprises heating cartridge.

15. Sensor arrangement according to any one of the preceding aspects, wherein the sensor housing comprises a copper plate, preferably for conducting heat and/or cold to and/or from the camera and/or the inclination sensor and/or associated electronic components.

16. Sensor arrangement according to any one of the preceding aspects, wherein the sensor housing comprises structures to dissipate heat away from the camera and/or the inclination sensor and/or associated electronic components.

17. Sensor arrangement according to any one of the preceding aspects, wherein the housing comprises a main carrier onto which the camera and the inclination sensor are mounted.

18. Sensor arrangement according to aspect 17, wherein the main carrier also provides means for connecting the shadow receiver and/or for mounting the housing to the solar power system.

18a. Sensor arrangement according to any one of aspects 17 or 18, wherein the main carrier 12 is adapted to achieve a stable relative and/or predefined positioning of the components connected thereto, preferably of the camera with regard to the inclination sensor, and further preferably, in addition thereto, of the shadow receiver and/or with regard to the SCA to which it is mounted.

18b. Sensor arrangement according to any one of the preceding aspects, wherein the sensor arrangement is an individual unit.

The system and method according to the present invention have proven to be advantageous, in particular in comparison with the solutions known from the prior art.

As far as the preceding description uses the term "essentially", embodiments realizing the respective feature in full or completely are also covered. The terms "a plurality of" or "several" are to be understood within the meaning of "at least two", i.e., two or more. As far as concrete values are indicated, slight deviations of these values are preferably covered as well, such as, for example deviations of ±10% or ±5% of the respective value. Individual aspects of the invention can form independent inventions and also be claimed as such.

The invention claimed is:

1. Concentrated solar power (CSP) system, comprising:

a reflector (SP);

a receiver tube (R);

a shadow receiver (6) arranged and adapted to receive the, preferably full, shadow of the receiver tube;

a first digital camera (K) fixedly attached to the CSP system and arranged and configured to acquire a first image of the reflector and of the shadow receiver; and a controller configured to:

identify a first portion of the first image that comprises the reflector and a second portion of the first image that comprises the shadow receiver;

determine a degree of soiling of the reflector based on the first portion of the first image and, preferably, ignore all information contained in the second portion of the first image for determining said degree of soiling; and determine an adjustment of the orientation of the reflector based on the second portion of the first image and, preferably, ignore all information contained in the first portion of the first image for determining said adjustment.

2. CSP system according to claim 1, wherein the controller is configured to identify dirt patterns in the first image, preferably the first portion of the first image.

3. CSP system according to claim 1, wherein the controller is configured to conduct a spectral analysis on the basis of the first image, preferably the first portion of the first image.

4. CSP system according to claim 3, further comprising a second digital camera, preferably fixedly attached to the CSP system, configured to acquire a second image of the sky;

wherein the controller is configured to determine the degree of soiling also on the basis of the second image.

5. CSP system according to claim 4, wherein the first digital camera and the second digital camera have the same type of imaging sensor.

6. CSP system according to claim 3, wherein the controller is configured to identify a spectral range or spectral ranges that is/are reduced and/or enhanced in the first image, preferably vis-à-vis the second image.

7. CPS system according to claim 6, wherein the controller is configured to determine that the soiling comprises organic soiling by determining that the red-component and/or green-component are/is enhanced in the first image and/or the green component and/or blue component are/is reduced.

8. CSP system according to claim 6, wherein the controller is configured to determine that the soiling comprises mineralic soiling by determining that no spectral range is substantially reduced or enhanced.

9. CSP system according to claim 1, wherein the reflector is a parabolic reflector; and wherein the image comprises an apex of the parabolic reflector.

10. CSP system according to claim 1, wherein the first camera is part of a sensor arrangement for tracking the CSP system, wherein said sensor arrangement comprises a housing;

wherein the housing comprises the first camera and, preferably, an inclination sensor.

11. CSP system according to claim 10, wherein the shadow receiver is attached to or only partly contained in but extending from said housing.

12. Method for determining a degree of soiling of a reflector of a concentrated solar power (CSP) system, preferably of the CSP system of claim 1, the CSP system comprising a reflector, a receiver tube and a shadow receiver arranged and adapted to receive the, preferably full, shadow of the receiver tube, the method comprising:

acquiring a first image of a reflector of the CSP system, preferably with the camera of the sensor arrangement;

identifying a first portion of the first image that comprises the reflector and a second portion of the first image that comprises the shadow receiver;

determining a degree of soiling of the reflector based on the first portion of the first image and, preferably, ignoring all information contained in the second portion of the first image for determining said degree of soiling; and determining an adjustment of the orientation of the reflector based on the second portion of the first image and, preferably, ignoring all information contained in the first portion of the first image for determining said adjustment.

13. A non-transitory storage medium storing a computer program which, when executed by a computer, cause the computer to carry out the method of claim 12.

14. A computer system comprising means for carrying out the method of claim 12.

* * * * *